(12) United States Patent
Scofield

(10) Patent No.: US 10,068,251 B1
(45) Date of Patent: Sep. 4, 2018

(54) SYSTEM AND METHOD FOR GENERATING PREDICTIONS BASED ON WIRELESS COMMERCE TRANSACTIONS

(75) Inventor: Christopher L. Scofield, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1311 days.

(21) Appl. No.: 12/147,162

(22) Filed: Jun. 26, 2008

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0251* (2013.01); *G06Q 30/0269* (2013.01)

(58) Field of Classification Search
USPC ......... 705/14.49, 14.53, 14.64, 14.66, 14.67; 725/34, 62; 455/414.1, 466, 412.1
See application file for complete search history.

(56) References Cited

U.S. PATENT DOCUMENTS

| | | | | |
|---|---|---|---|---|
| 5,572,221 A * | 11/1996 | Marlevi | ............... | H04W 28/18 342/452 |
| 6,185,558 B1 * | 2/2001 | Bowman | ........... | G06F 17/30646 705/37 |
| 6,343,317 B1 * | 1/2002 | Glorikian | ............ | G06F 17/3087 455/456.3 |
| 6,424,949 B1 * | 7/2002 | Deaton et al. | ............. | 705/14.25 |
| 6,438,579 B1 * | 8/2002 | Hosken | ............. | G06F 17/30867 707/999.002 |
| 6,484,148 B1 * | 11/2002 | Boyd | ..................... | G06Q 30/02 340/8.1 |
| 6,571,279 B1 * | 5/2003 | Herz | ................. | G06F 17/30867 707/999.01 |
| 6,782,370 B1 * | 8/2004 | Stack | ..................... | G06Q 30/02 705/26.1 |
| 7,228,155 B2 * | 6/2007 | Saunders | ............... | G06Q 20/20 379/114.19 |
| 7,594,189 B1 * | 9/2009 | Walker | ............. | G06F 17/30867 715/811 |
| 7,890,367 B2 * | 2/2011 | Senghore | ............. | B01J 23/6562 705/14.28 |

(Continued)

*Primary Examiner* — Luis A Brown
(74) *Attorney, Agent, or Firm* — Robert C. Kowert; Meyertons, Hood, Kivlin, Kowert & Goetzel, P.C.

(57) ABSTRACT

Various embodiments of a system and method for generating predictions based on wireless commerce transactions are described. Various embodiments may include a wireless commerce transaction analysis system configured to generate one or more models based on aggregated wireless commerce transaction information indicating one or more wireless commerce transactions completed with respective mobile devices of multiple users. For each of at least some of the wireless commerce transactions, the aggregated wireless commerce transaction information may indicate one or more characteristics of the wireless commerce transaction. The wireless commerce transaction analysis system may also be configured to generate a prediction of a future action to be performed by a user of a particular mobile device. The generation of the prediction may be dependent upon an evaluation of the one or more models and one or more wireless commerce transactions completed with the particular mobile device at one or more locations.

29 Claims, 12 Drawing Sheets

(56) References Cited

U.S. PATENT DOCUMENTS

| | | | |
|---|---|---|---|
| 7,921,069 B2* | 4/2011 | Canny | G06Q 30/02 706/47 |
| 8,359,239 B1* | 1/2013 | Cook | G06Q 30/04 705/16 |
| 2001/0014868 A1* | 8/2001 | Herz | G06Q 10/0637 705/14.38 |
| 2001/0036224 A1* | 11/2001 | Demello | H04L 63/30 375/220 |
| 2002/0050927 A1* | 5/2002 | De Moerloose | H04W 4/02 340/539.1 |
| 2002/0077130 A1* | 6/2002 | Owensby | H04M 3/42348 455/466 |
| 2003/0087652 A1* | 5/2003 | Simon | G06Q 30/02 455/466 |
| 2003/0208754 A1* | 11/2003 | Sridhar | G06Q 30/02 725/34 |
| 2003/0212760 A1* | 11/2003 | Chen | G06F 17/18 709/218 |
| 2004/0006510 A1* | 1/2004 | Lertzman | G06Q 30/02 705/14.52 |
| 2005/0222903 A1 | 10/2005 | Buchheit et al. | |
| 2006/0064346 A1* | 3/2006 | Steenstra | G06Q 30/0261 705/14.64 |
| 2006/0242011 A1* | 10/2006 | Bell et al. | 705/14 |
| 2006/0271552 A1* | 11/2006 | McChesney | G06Q 30/02 |
| 2007/0010942 A1* | 1/2007 | Bill | G01C 21/3617 701/424 |
| 2007/0162341 A1* | 7/2007 | McConnell | G06Q 30/02 705/14.38 |
| 2007/0192183 A1* | 8/2007 | Monaco et al. | 705/14 |
| 2007/0233729 A1* | 10/2007 | Inoue | G06F 21/6254 |
| 2007/0265984 A1* | 11/2007 | Santhana | G06Q 20/10 705/65 |
| 2007/0282684 A1* | 12/2007 | Prosser | G06Q 30/02 705/14.54 |
| 2008/0004888 A1* | 1/2008 | Davis | G06Q 20/3224 705/26.1 |
| 2008/0021772 A1* | 1/2008 | Aloni et al. | 705/14 |
| 2008/0270250 A1* | 10/2008 | Bolivar | G06Q 30/02 705/26.1 |
| 2008/0288354 A1* | 11/2008 | Flinn | G06N 99/005 705/14.53 |
| 2009/0006194 A1* | 1/2009 | Sridharan et al. | 705/14 |
| 2009/0006363 A1* | 1/2009 | Canny | G06Q 30/02 |
| 2009/0163183 A1* | 6/2009 | O'Donoghue | G06Q 30/02 455/414.1 |
| 2009/0248533 A1* | 10/2009 | Colemen | G06Q 20/32 705/26.1 |
| 2010/0030651 A1* | 2/2010 | Matotek | G06Q 20/105 705/17 |

\* cited by examiner

SYSTEM AND METHOD FOR GENERATING PREDICTIONS BASED ON WIRELESS COMMERCE TRANSACTIONS

BACKGROUND

Mobile phones have gone from being rare and expensive pieces of equipment used primarily by the business elite, to pervasive low-cost personal items. In many countries, mobile phones now outnumber land-line telephones, with most adults and many children now owning mobile phones. In the United States, approximately 50% of children own mobile phones. It is not uncommon for people to simply own a mobile phone instead of a land-line for their residence. In some developing countries there is little existing fixed-line infrastructure and consequently mobile phone use has become widespread. In general, a mobile or cellular telephone is a long-range, portable electronic device for personal telecommunications over long (or short) distances. Most current mobile phones connect to a cellular network of base stations (cell sites), which is in turn interconnected to the public switched telephone network (PSTN) (satellite phones being one exception).

With high levels of mobile telephone penetration, a mobile culture has evolved, where the phone is used as a key social tool. Many phones offer text-messaging services to increase the simplicity and ease of text-based communications. Many people keep in touch using text messaging, such as SMS, and a whole culture of "texting" has developed from this. Some phones also offer Internet and email access such that mobile users can access websites and electronic mail on the go. In some cases, mobile telephones include functionality to engage a transaction terminal and complete a transaction.

Traditionally, commercial advertising has been concerned with attempting to get the most consumers as possible to see the particular advertisement. Various media have been used for advertising over the years, such as, billboards, printed flyers, radio, cinema and television ads, web banners, web popups, magazines, newspapers, and even the sides of buses, taxicab doors and roof mounts. Advertisers generally must select a static location at which to place their advertisement and hope that consumers happen upon them.

Figure 1:
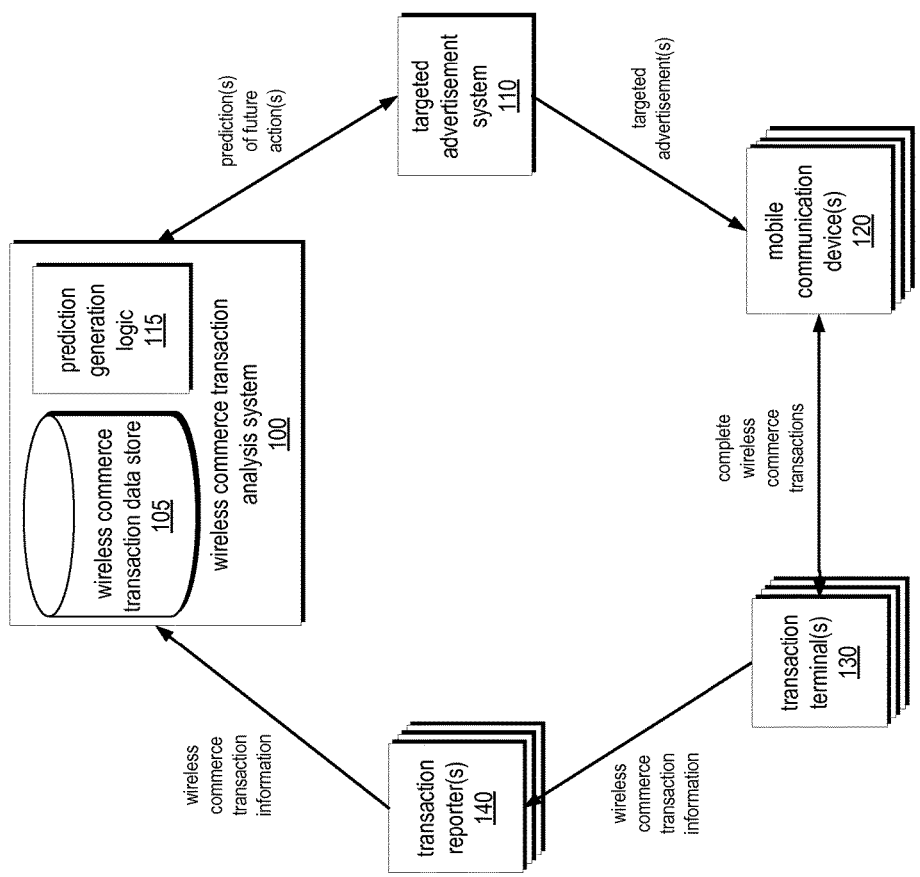
FIG. 1 illustrates a block diagram of a system including a wireless commerce transaction analysis system, according to some embodiments.

While the system and method for generating predictions based on wireless commerce transactions is described herein by way of example for several embodiments and illustrative drawings, those skilled in the art will recognize that the system and method for generating predictions based on wireless commerce transactions is not limited to the embodiments or drawings described. It should be understood, that the drawings and detailed description thereto are not intended to limit the system and method for generating predictions based on wireless commerce transactions to the particular form disclosed, but on the contrary, the intention is to cover all modifications, equivalents and alternatives falling within the spirit and scope of the system and method for generating predictions based on wireless commerce transactions as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for generating predictions based on wireless commerce transactions are described. The system and method for generating predictions based on wireless commerce transactions may include a wireless commerce transaction analysis system (WCTAS) 100 configured to generate predictions of a user's actions (e.g., actions of mobile communication device users) based on wireless commerce transaction information associated with transactions completed by a community of mobile communication device users. Such transaction information may include, among other things, items purchased during a transaction and the location of commerce at which the transaction was completed. WCTAS 100 may utilize such transaction information to generate a prediction as to one or more future actions to be performed by a given mobile communication device user. Such prediction may be additionally dependent on one or more transactions completed by the given mobile communication device user. For example, WCTAS 100 may determine that a given mobile communication device user has wirelessly purchased a particular sequence of items at one or more locations of commerce. Based on such information and aggregate wireless commerce transaction information for multiple other users, WCTAS 100 may generate a prediction as to one or more future actions to be performed by the given mobile communication device user. For example, WCTAS 100 may generate a prediction that the given user is likely to purchase a laptop computer at an electronics store and a laptop computer case at a luggage store. A targeted advertisement system (which may in some cases be implemented as part of the same system in which WCTAS 100 is implemented) may generate advertisements based on such predictions and provide such advertisements to the given mobile communication device user. For example, based on the exemplary predictions described above, the targeted advertisement system might generate an electronic coupon (or other discount offer) for a laptop computer case and deliver such advertisement to the given mobile communication device user's mobile communication device (e.g., via text message). Various other possible implementations of the system and method for generating predictions based on wireless commerce transactions are described herein.

Data Collection/Data Reporting

FIG. 1 is a logical block diagram illustrating various components of a system for generating predictions based on wireless commerce transactions. In the illustrated embodiment, wireless commerce transaction analysis system 100 (which may in some cases be referred to herein as system 100) may be configured to generate predictions of future actions that may be performed by users of mobile devices, as described in more detail herein. Additionally, the illustrated embodiment includes a targeted advertisement system 110 (which may in some cases be referred to herein as target ad system 110 or simply system 110) that may generate advertisements based on such predictions as well as communicate such predictions to users of mobile communication devices. In some embodiments, the functionality of WCTAS 100 and targeted ad system 110 may be combined into a single system. Examples of system configurations, each of which may be employed in various embodiments, are described in more detail with respect to FIGS. 9A-9C.

To generate predictions of future actions that may be performed by users of mobile devices, WCTAS 100 may collect information about multiple wireless commerce transactions, as described in more detail herein. In the illustrated embodiment, one or more mobile communication devices 120 may be utilized (e.g., by users of such devices) to wirelessly complete one or more transactions with one or more transaction terminals 130. As used herein, "wireless commerce transaction information" (or data) may include information that indicates one or more characteristics about such transactions. Such characteristics may include but are not limited to a user identifier that identifies the mobile communication device user (e.g., a name or identification number such as customer number, driver's license number, or some other identifier). Such characteristics may also include a device identifier of the mobile communication device used to complete a given transaction (e.g., a phone number, serial number, International Mobile Equipment Identity number, or some other identifier). Such characteristics may also include payment information associated with the transaction (e.g., payment amount, credit account numbers, charge account numbers, bank account numbers, routing numbers, amount of funds to be withdrawn for remuneration, etc.). Such characteristics may include item identifiers that identify items (e.g., property or services) exchanged in the given transaction, such as Stock Keeping Units (SKUs), Universal Product Codes (UPCs), European Article Numbers (EANs), Global Trade Item Numbers (GTINs), part numbers, or other identifiers suitable for identifying an item. Such characteristics may also include a timestamp that indicates the time at which a given transaction is completed. Such characteristics may also include an identifier that identifies the location of commerce at which the transaction is completed (e.g., a store name, store number, or some combination thereof). Such characteristics may also include information that indicates the physical location of the location of commerce at which the given transaction is completed (e.g., an address of a store or establishment, geographic coordinates, etc.). Wireless commerce transaction information may include any combination of these characteristics. In some cases, wireless commerce transaction may also include characteristics not explicitly described herein; in general, wireless commerce transaction information may include any combination of characteristics associated with a wireless commerce transaction.

In various embodiments, WCTAS 100 may be available to generate predictions while collecting wireless commerce transaction data. However, in some embodiments, WCTAS 100 may collect a specified amount of wireless commerce transaction data before generating predictions. For example, since the predictions generated by WCTAS 100 may be dependent upon the wireless commerce transaction data that is collected (as described in more detail below), WCTAS 100 may be configured to "prime" the set of collected wireless commerce transaction information. In other words, by collecting a specified amount of wireless commerce transaction data before generating predictions, WCTAS 100 may ensure that the predictions are generated based on statistically significant information.

A transaction may generally refer to any type of exchange of services or property (e.g., tangible or intangible goods, real property, intellectual property, or present or future interests in property) between a providing party (e.g., the party providing the services or property) and a receiving party (e.g., the party receiving the services or property). (Generally speaking, any interest in property other than real property may be generically referred to herein as personal property.) Such an exchange may be structured as a sale, lease, barter, donative or other type of transaction. In some instances, third parties may be involved in the transaction, for example as guarantors or beneficiaries. The property or services subject to the transaction may be exchanged for any type of consideration, such as cash, an instrument of payment (e.g., a check or draft), an electronic funds transfer, other property or services, or a promise to provide any of these in the future, for example. In some instances, the property or services subject to the transaction may be given without any consideration in return, for example as a gift.

A wireless commerce transaction may include any transaction as described above with the additional stipulation that the consideration (or information representing the consideration) is wirelessly transmitted from the receiving party to the providing party. The consideration or information representing the consideration may include but is not limited to account numbers (e.g., credit, bank or savings account numbers), information for debiting accounts associated with such account numbers (e.g., routing numbers and personal identification numbers) or derivations of such data (e.g., encrypted accounted account numbers, encrypted personal identification numbers, etc.). In general, the consideration or information representing the consideration may include any information that enables a providing party (e.g., a merchant) to access remuneration for providing services or property to the receiving party. In some embodiments, a wireless commerce transaction may include a transaction where the consideration or information representing the consideration is wirelessly transmitted to a terminal at a location of commerce (e.g., a store or establishment) owned, operated or controlled by the providing party.

Mobile communication devices 120 may include any of various devices configured to communicate wirelessly including but not limited to cellular telephones, smart phones, personal digital assistants (PDAs), two-way pagers or other devices configured to communicate via one or more cellular technologies including but not limited to Global System for Mobile Communications (GSM), General Packet Radio Service (GPRS), Code Division Multiple Access (CDMA), Time Division Multiple Access (TDMA), Evolution-Data Optimized (EV-DO), Enhanced Data Rates for GSM Evolution (EDGE), Universal Mobile Telecommunications System (UMTS), and/or other cellular technologies, whether such technologies are presently known or developed in the future. In some embodiments, any given mobile communication device 120 may be configured to communicate wirelessly via other wireless communication protocols including but not limited to the set of standards for wireless local area network (WLAN) computer communication known as IEEE 802.11 or Wi-Fi, WiMAX or some other wireless data communication standard, whether presently known or developed in the future.

Figure 2:
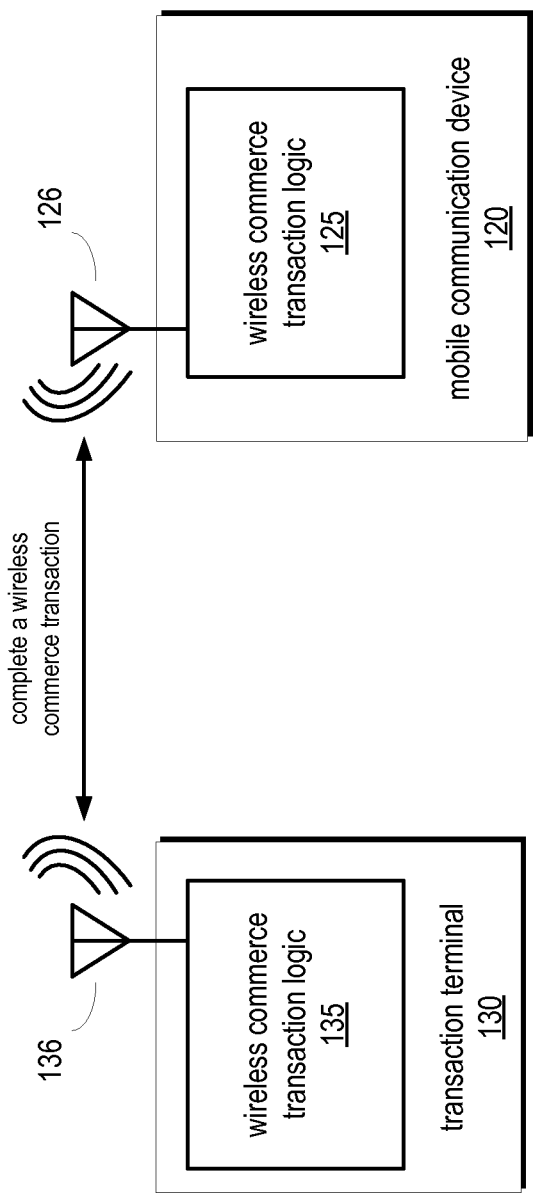
FIG. 2 illustrates wireless commerce transaction logic of a transaction terminal and a mobile communications device according to some embodiments.

In various embodiments, mobile communication devices 120 may include functionality for performing a wireless commerce transaction with a terminal. Referring collectively to FIGS. 1 and 2, any given mobile communication device 120 may include wireless commerce transaction logic 125, which may provide mobile communication device 120 with functionality for completing a wireless commerce transaction with a terminal. Likewise, any given transaction terminal 130 may include wireless transaction commerce transaction logic 135, which may provide transaction terminal 130 with functionality for completing a wireless commerce transaction with a mobile communication device.

In one embodiment, wireless commerce transaction logic 125 and/or wireless commerce transaction logic 135 may include Radio-frequency identification technology (RFID), such as RFID tags or transponders (or interrogators). In various embodiments, wireless commerce transaction logic 135 may include an RFID interrogator configured to interrogate RFID tags within a given proximity. Such proximity may be limited or defined by the capability or configuration of either the RFID interrogator or the RFID tags to which the RFID interrogator communicates. In some embodiments, an RFID tag of wireless commerce transaction logic 125 may initiate communication with wireless commerce transmission logic 135.

In some embodiments, wireless commerce transaction logic 125 may include a passive RFID tag, such as hardware logic that is powered by electrical current induced in antenna 126 by an incoming radio frequency signal, such as one or more signals transmitted from transaction terminal 130. Such current may power an integrated circuit within the passive RFID tag. In some embodiments, such an integrated circuit may be configured to transmit information back to the terminal via backscattering. For instance, the integrated circuit may collect power from an incoming signal via antenna 126, use such power for operation of the integrated circuit, and also use such power for transmitting a signal back to an RFID interrogator, such as terminal 130. In other embodiments, transaction logic 125 may include an active RFID tag, such as an RFID tag that contains or has direct access to a power source (e.g., a battery, such as a battery that powers mobile communication device 120) for powering the integrated circuit and antenna. In other embodiments, transaction logic 125 may include a semi-passive RFID tag, such as an RFID tag that contains or has direct access to a power source for powering the tag's integrated circuit and utilizes backscattering for transmitting outgoing signals from the tags antenna. In other embodiments, transaction logic 125 may include some combination of the above-described tags, or other RFID configurations whether currently known or developed in the future. In any of the above described configurations, wireless commerce transaction information 125 may also include memory (e.g., volatile or nonvolatile memory) for storing data or information accessible by the RFID tag. Such information may include the information representing consideration for transactions (e.g., payment account information) as described above. Such information may be transmitted to transaction terminal 130 by wireless commerce transaction information 125 via antenna 126.

Wireless commerce transaction logic 135 and wireless commerce transaction logic 125 may exchange various types of information in order to carry out a transaction including but not limited to the wireless commerce transaction information described above. Additionally, such information may be exchanged according to any of various protocols including but not limited to protocols that employ varying degrees of cryptography, encryption, or authentication. For instance, logic 125 and 135 may communicate wireless commerce transaction information according to a challenge-response authentication protocol. In some cases, to complete a transaction with a transaction terminal 130, a mobile communication device user may be required to enter a personal identification number (PIN) or some other authentication information via an input device of the mobile communication device (e.g., a keypad) in order to complete a transaction. Other types of authentication techniques may be employed by terminals 130 and or mobile communication devices 120 while remaining within the spirit and scope of various embodiments.

While wireless commerce transaction logic 125 and 135 are largely described as exchanging information via RFID functionality, such wireless commerce transaction logic may in various embodiments employ other types of wireless communication functionality (in addition to or in lieu of RFID) and remain within the spirit and scope of various embodiments. For example, in some embodiments, Bluetooth®, Wi-Fi, or some other wireless communication protocol may be employed.

As illustrated by FIG. 1, transaction terminals 130 may be configured to provide wireless commerce transaction information to transaction reporters 140. Transaction reporters 140 may forward the wireless commerce transaction information to WCTAS 100 for further analysis. In some cases, transaction reporters 140 may be configured to modify the wireless commerce transaction information before providing such information to WCTAS 100. For instance, transaction reports may modify the wireless commerce transaction information such that the information conforms to a data format that is accepted by WCTAS 100. In various embodiments, transaction reporters 140 transmit wireless commerce transaction information to WCTAS 100 as such information is received from various terminals (e.g., transmitted "on-the-fly"). In other cases, the transaction reporters 140 may retain a given amount of collected wireless commerce transaction information for a particular amount of time before transmitting such information to WCTAS 100. For instance, such information may be transferred to WCTAS 100 in a batched manner. In various embodiments, wireless commerce transaction information may be transmitted to WCTAS 100 upon receiving a request from WCTAS 100 for such information. In other cases, wireless commerce transaction information may be transmitted to WCTAS 100 according to a schedule (e.g., a periodic or aperiodic schedule).

Figure 9A:
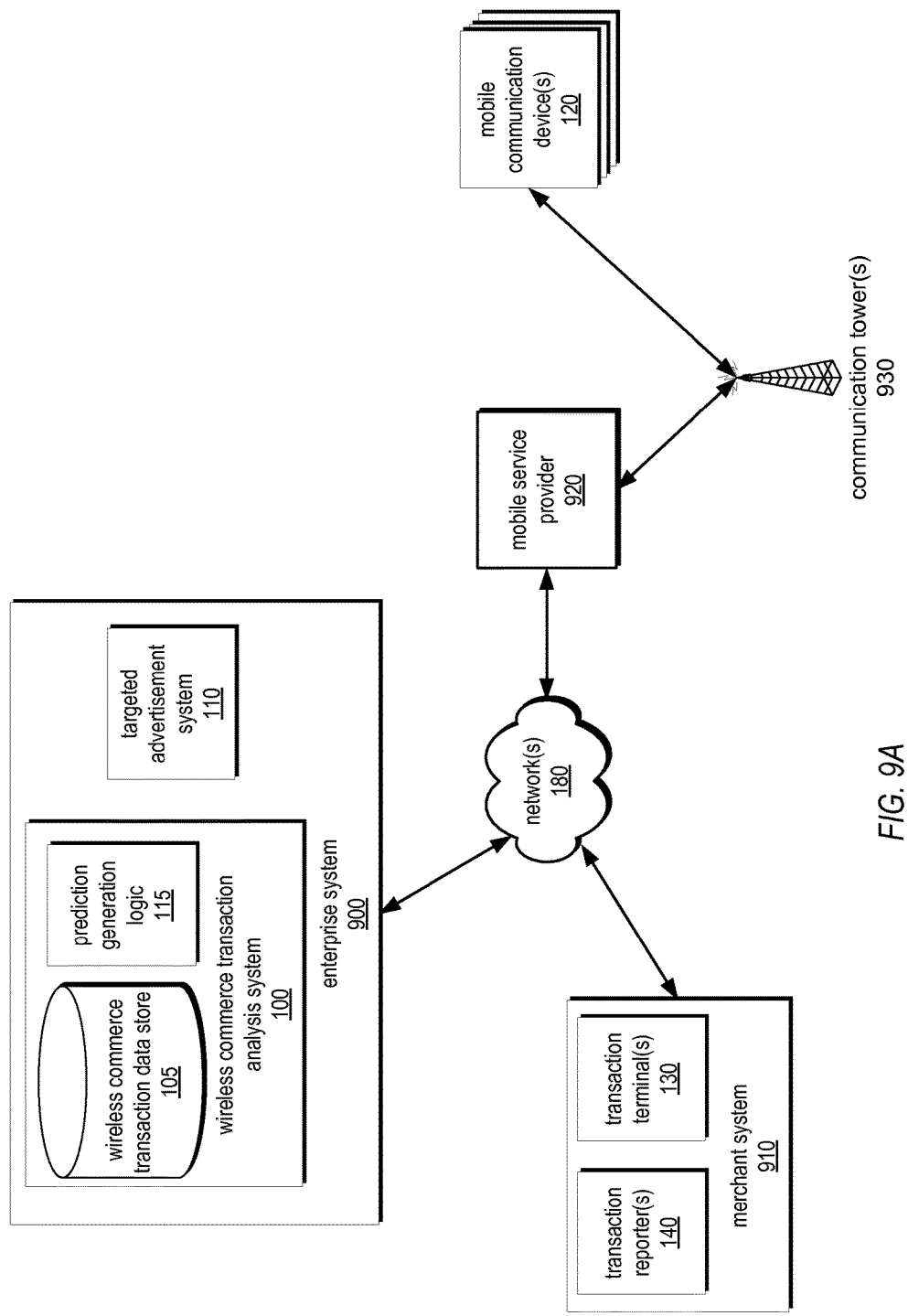
FIG. 9A illustrates a block diagram representing one example of a system configuration for a system including a wireless commerce transaction analysis system, according to some embodiments.
Figure 9B:
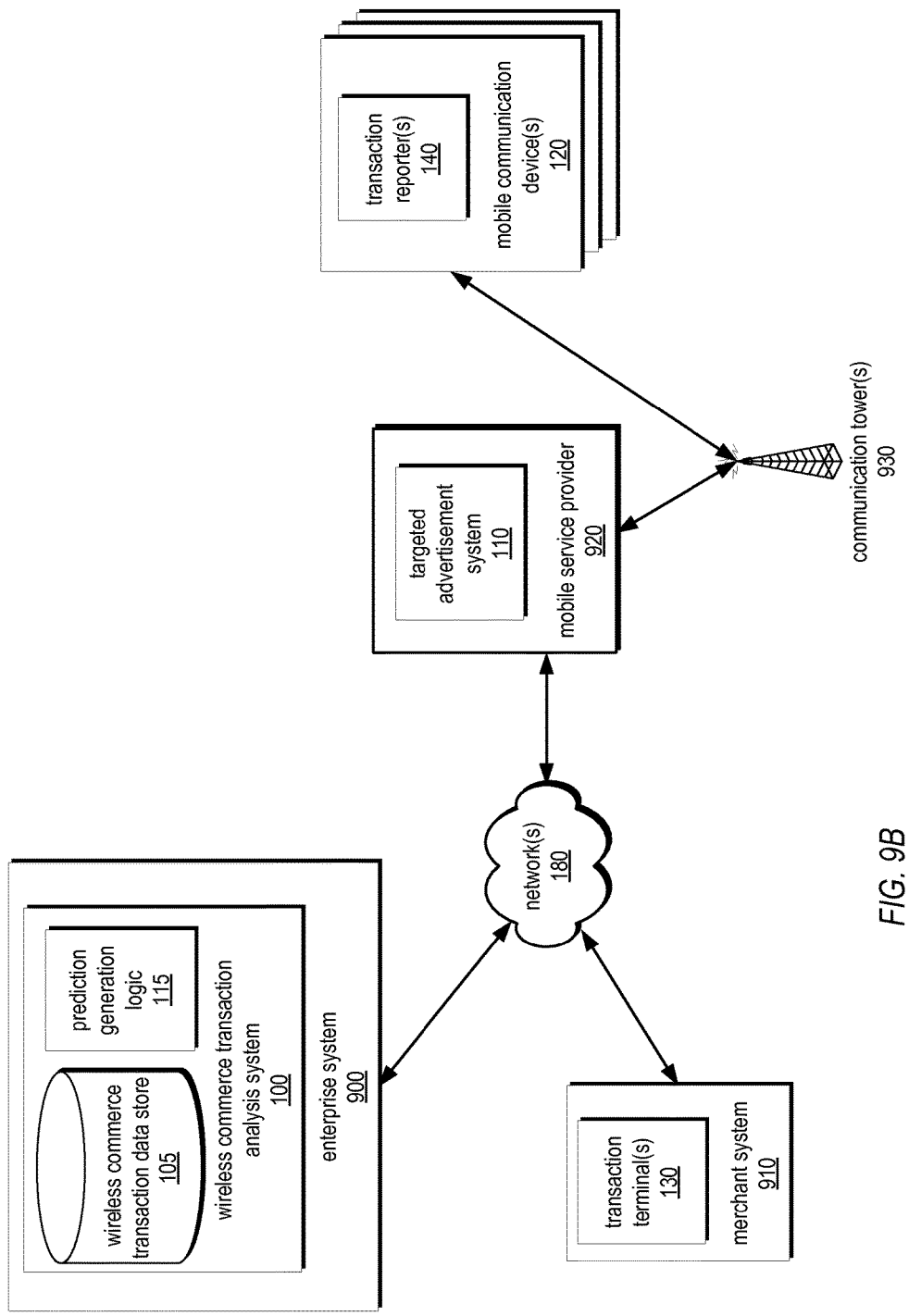
FIG. 9B illustrates a block diagram representing another example of a system configuration for a system including a wireless commerce transaction analysis system, according to some embodiments.
Figure 9C:
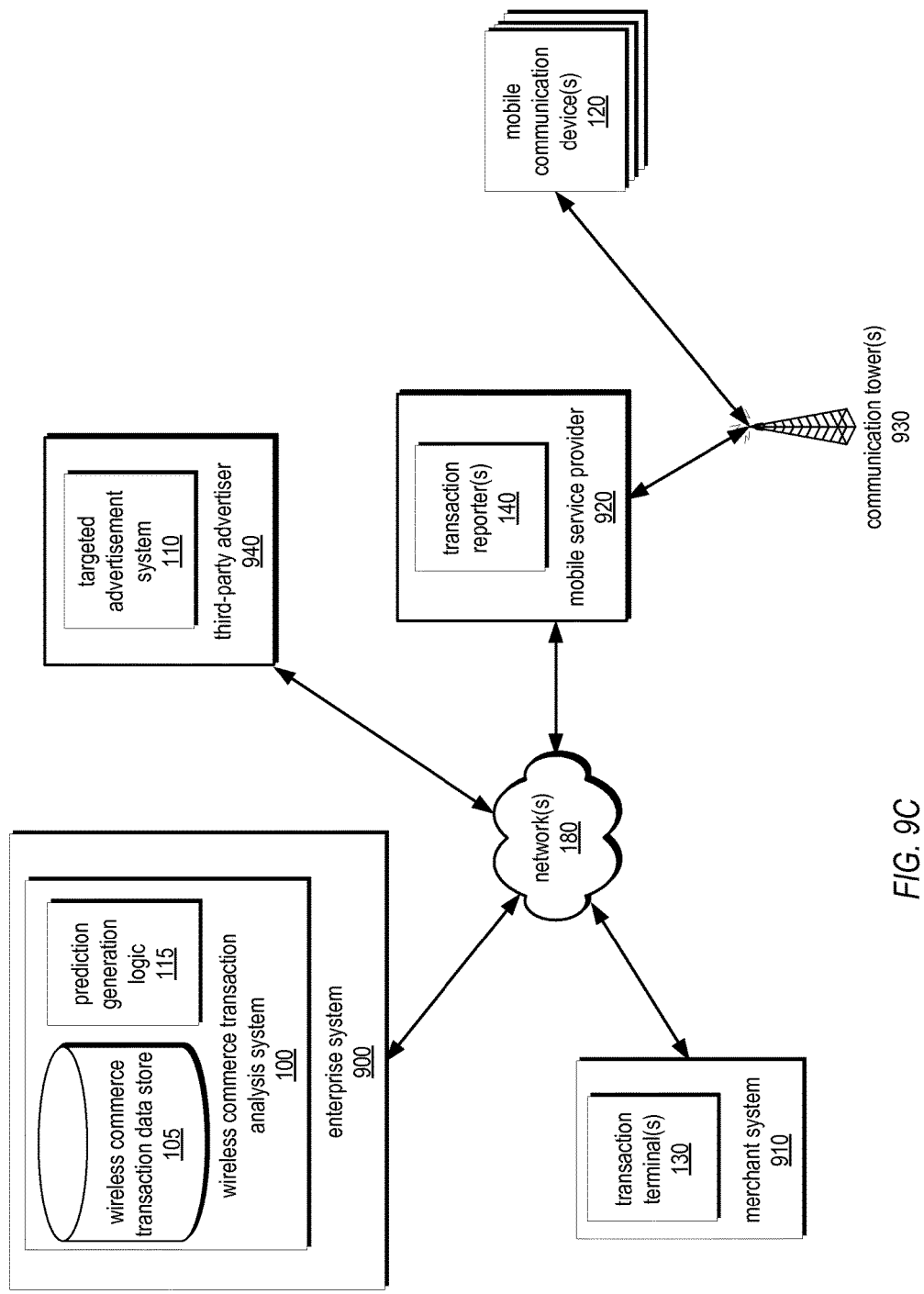
FIG. 9C illustrates a block diagram representing another example of a system configuration for a system including a wireless commerce transaction analysis system, according to some embodiments.

In addition to (or as an alternative to) transaction terminals 140 providing wireless commerce transaction information to transaction reporters 140, one or more of mobile communication devices 120 may in some embodiments provide wireless commerce transaction information to transaction reporters 140. FIGS. 9A-9C (described in more detail below) illustrate various system configurations in which transaction reporters 140 may be configured to receive wireless commerce transaction information from transaction terminals 130 or mobile communication devices 120.

Wireless commerce transaction analysis system 100 may be configured to aggregate the wireless commerce transaction information that it receives, as illustrated by wireless commerce transaction data store 105. Aggregated wireless commerce transaction information may be stored in data store 105, which may be configured as a database, as one or more mass storage devices (e.g., physical disks, logical volumes, etc.) configured to store data blocks or files, or as any other suitable configuration for data storage. In some embodiments, prediction generation logic 115 may be configured to aggregate incoming wireless commerce transaction information by storing such information within data store 105.

In various embodiments, the collection and/or reporting of wireless commerce transaction information may be structured to ensure anonymity of mobile communication device users. For instance, transaction reporters 140 may be configured to assign a random identifier (or other type of identifier from which a particular mobile communication device may not be determined) for reporting wireless commerce transaction information associated with a given mobile communication device user. Subsequent wireless commerce transaction information may also be tagged or labeled with a given user's random identifier such that WCTAS 100 may determine a sequence or path of wireless commerce transactions for a give user, as described in more detail in the following section. The use of a random identifier (or other identifier for anonymizing mobile communication device users) may be employed by any of the components of the illustrated system. For instance, as described in more detail below, targeted advertisement system 110 may request a prediction for a given user from WCTAS 100. In some cases, targeted ad system 110 may indicate the particular user to WCTAS 100 by a random or anonymizing identifier, such as an identifier assigned by transaction reporters 140 or, alternatively, an identifier assigned by targeted advertisement system 110.

Generating a Predictive Model

As described above, WCTAS 100 may be configured to generate a prediction of a future action that may be performed by a user of a mobile device. In various embodiments, WCTAS 100 may be configured to generate such a prediction based on a predictive model. Such predictive model may be generated by WCTAS 100 based on the aggregated wireless commerce transaction data. Note that use of the term "model" is not intended to limit the operation of WCTAS 100 in any way. In other words, in some embodiments, the wireless commerce transaction information itself may serve as such model, irrespective of whether WCTAS 100 performs additional analysis, computation or evaluation on such information. For instance, in some embodiments, the predictive model may be the aggregated wireless commerce transaction information and WCTAS 100 may generate such model by aggregating the received wireless commerce transaction information within wireless commerce transaction data store 105.

In various embodiments, generating a predictive model may include performing one or more computations, analyses, or evaluations on the aggregated wireless commerce transaction information. As described in more detail herein, predictions generated by WCTAS 100 may be dependent upon such computations, analyses, or evaluations. In general, while various examples of such computations, analyses, and evaluations are described herein, any suitable computation, analysis, or evaluation of wireless commerce transaction information may be employed. Examples of such computations, analyses, or evaluations may include performing a Bayesian analysis of wireless commerce transaction information to determine a prediction of a future action that may be performed by a user of a mobile communication device (e.g., a prediction as to a future item that is likely to be purchased and/or a future location of commerce that is to be visited). Another example of such computations, analyses, or evaluations may include generating a stochastic model and using such model to generate a prediction of a future action that may be performed by a user of a mobile communication device. Another example of such computations, analyses, or evaluations may include performing a regression analysis to generate a prediction of a future action that may be performed by a user of a mobile communication device. In general, any computation, analysis, or evaluation of wireless commerce transaction leading to a prediction of a future action to be performed by a user of a mobile communication device may be included as part of the predictive model described herein. Another example of generating a predictive model may include generating a graph-based representation of reported transactions and utilizing such representation to generate a prediction of a future action that may be performed by a user of a mobile communication device, as described in further detail below with respect to FIGS. 3-6.

As described in more detail in the following section, targeted advertisement system 110 may be configured to generate targeted advertisements to mobile users based on the predictions generated by WCTAS 100. For instance, WCTAS 100 may generate a prediction that indicates a mobile communication device user is likely to visit a particular location of commerce (e.g., a store or establishment) and/or purchase a particular type of item. Accordingly, targeted advertisement system 110 may generate advertisements related to such location of commerce, such as coupons or discount offers valid at such location of commerce. In addition to or as an alternative to such location of commerce advertisements, targeted advertisement system 110 may generate advertisements related to a type of product (or a specific product, such as identified by a SKU) based on a prediction generated by WCTAS 100.

In various embodiments, the occurrence of a transaction (and/or information indicating characteristics of such transaction) may be used as the basis for deriving metrics indicative of the relative interest of the given transaction to users of mobile communication devices, as reflected by actual completed transactions. Frequently, a mobile communication device user may generate a relationship between two transactions by completing each transaction within a given period of time (a "session"). For example, a mobile communication device user may complete a transaction by purchasing an item at a location of commerce, such as by purchasing a television at an electronics store. Subsequently, the user may complete another transaction that may be in some way related to the original transaction. For instance, subsequent to purchasing the television at an electronics store, a mobile communication device user might travel to a furniture store to purchase an entertainment credenza on which to place the television. In one embodiment, by purchasing two (or more) items within a session, a reference may be generated between the original transaction and one or more subsequent transactions, even though no explicit relationship may exist between such transactions, and even in cases where the transactions appear to be unrelated with respect to each other. For example, based on information received from transaction reporters 140, WCTAS 100 may be configured to determine that a mobile communication device user has purchased two or more items within a session. WCTAS 100 may be configured to generate and store a representation of such determination as describe in more detail below.

Note that the length of the session described herein may be specified by WCTAS 100, another system (e.g., targeted advertisement system 110) or a system administrator. For example, in many cases, the length of such session may be specified to correspond to the length of a shopping experience. However, in various embodiments, any suitable session length may be utilized. For instance, in some cases, the length of a session may be dependent upon the type of analysis being performed on the wireless commerce transaction data (e.g., session length may be a static or variable parameter of such analysis). For example, a short session length may be utilized for generating real-time or near real-time predictions of a mobile communication device user's future actions. Since different wireless commerce transaction patterns may be apparent dependent on the length of a session, a more long-term approach (e.g., longer session) may yield different transaction patterns and thus different predictions as to a mobile communication device user's future actions.

Figure 3:
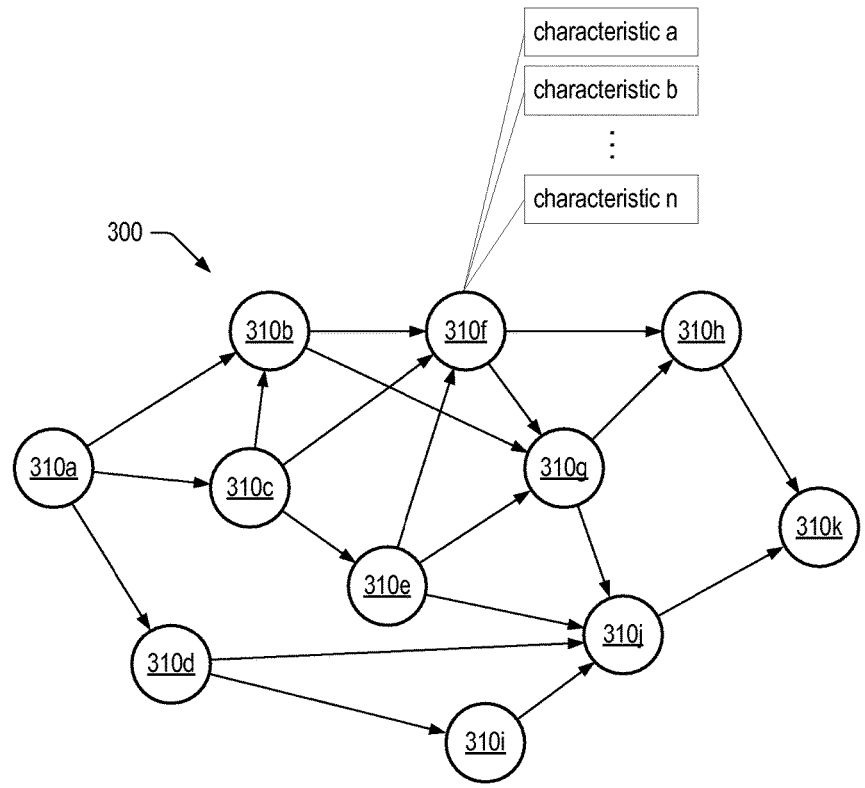
FIG. 3 illustrates a representation of a transaction graph, according to some embodiments.

A user's completion of a transaction with a mobile communication device (e.g., mobile communication device 120) may be referred to as user completion of a transaction. If a user subsequently completes another transaction with the mobile communication device within a session, a path may be said to exist between the related transactions. A sequence of paths in which the destination of one path functions as the origin of another path may be referred to as an aggregate path. A collection of transactions may present a variety of paths and aggregate paths from one transaction to another. For example, a first transaction may be indicated as linked to a second transaction (by virtue of being completed within the same session), which in turn links to a third transaction purchased within the same session, and so forth. These relationships among transactions may be represented as a graph, of which one embodiment is illustrated in FIG. 3.

In the illustrated embodiment, graph 300 is shown to include a number of wireless commerce transactions 310*a-k*. Transactions 310 may encompass, for example, any of the various types of wireless commerce transactions discussed previously. In general, any given transaction of graph 300 may be defined by its characteristics, including but not limited to the characteristics described above with respect to wireless commerce transaction information. For instance, one or more of such characteristics may include a user identifier, a device identifier, payment information, item identifiers, a timestamp, information identifying the location of commerce at which the transaction is completed, information indicating the physical location of the location of commerce at which the given transaction is completed, and other information about a given transaction. As an example, such characteristics are illustrated as characteristics a-n with respect to transaction 310*f*. For clarity of illustration, FIG. 3 includes a representation of such characteristics (e.g., characteristics a-n) only for transaction 310*f*; however, each other transaction may also have various characteristics associated with it. In some cases, such characteristics may be viewed as metadata associated with each transaction. Such metadata may be generated, stored, and/or accessed by WCTAS 100 in order to generate predictions as described herein. Also note that in some cases varying amounts of metadata may be present for each transaction represented by graph 300. For instance, transaction terminals 300 of various locations of commerce may each be configured to report (e.g., to transaction reporters 140) various levels of detail with respect to wireless commerce transaction information. For instance, one transaction terminal may be configured to report a device identifier, one or more SKUs, and a timestamp whereas another transaction terminal may be configured to report a device identifier, customer identifier, location of commerce address, one or more SKUs, and a timestamp. In some embodiments, the analyses, computations, and/or evaluations performed by WCTAS 100 maybe performed on varying degrees of transaction detail. For instance, in one embodiment, the WCTAS 100 may be configured to ignore certain transaction characteristics or, alternatively, consider any transaction characteristics that are available.

In various embodiments, each transaction 310 may represent one or multiple reported transactions, such as transactions reported by transaction reporter 140. For example, WCTAS 100 may indicate multiple, disparate reported transactions as being represented by a single transaction 310 dependent upon determining that the reported transactions have one or more transaction characteristics (e.g., item identifier, location of commerce identifier, etc.) in common. In some cases, WCTAS 100 may require that each characteristic known for a given reported transaction be the same as each respective characteristic of another reported transaction before indicating such transactions as represented by the same transaction 310. In other cases, to indicate two reported transactions as being represented by the same transaction 310, WCTAS may perform such indication in response to determining that at least a subset of known characteristics are the same as respective characteristics of another reported transaction. For example, a variety of characteristics (e.g., item identifier, location of commerce identifier, purchase price, etc.) may be known for two reported transactions. In this example, WCTAS may indicate each reported transaction as being represented by the same transaction 310 if at least an item identifier of each reported transaction is the same even though other characteristics of the two reported transactions may differ. In various embodiments, the characteristics that are evaluated to determine whether two or more reported transactions are to be represented by a single transaction 310 may be dependent upon the analysis utilized by WCTAS 100 to evaluate wireless commerce transaction information. For example, in some cases, the analysis of such data may be directed to an item level representation of graph 300 (e.g., a given transaction 310 may represent reported transactions having the same item identifiers). In other cases, the analysis of such data may be directed to a merchant level representation of graph 300 (e.g., a given transaction 310 may represent reported transactions having the same location of commerce identifiers). In other cases, the analysis of such data may be directed to a representation of graph 300 where each given transaction 310 represents reported transactions having multiple characteristics in common (e.g., a given transaction 310 may represent reported transactions having the same location of commerce identifiers and the same item identifiers).

Paths relating different transactions 310 are shown as directional arrows between the related transactions. Thus, for example, paths exist between transaction 310a and transactions 310b-d. By contrast, no direct path exists between transaction 310a and transaction 310e, although one or more users may have previously completed transaction 310e subsequent to completing transaction 310c within the same session. In some instances, where one path exists from a first transaction 310 to a second transaction 310, another path or paths may also exist that lead from the second transaction 310 back to the first transaction 310, either directly or via some other transaction 310. Consequently, it is possible that cycles may exist within graph 300, although for simplicity of exposition these are not shown in the illustrated embodiment.

As described previously, a path between two transactions 310 may be generated on the basis of wireless commerce transaction patterns that may not involve an explicit relationship between transactions, items of such transactions, and/or locations of commerce at which such transactions are completed. Generally speaking, the relationships represented within graph 300 may reflect any of the various orders in which users may complete transactions 310, irrespective of whether explicit relationships exist among the transactions. A representation of graph 300 may be constructed by WCTAS 100 in a variety of ways. In one embodiment, the structure of graph 300 may be derived through analysis of aggregated wireless commerce transaction information to determine which transactions have been completed within a session by respective users. Such a usage-driven representation of graph 300 may not represent every possible path that exists among transactions 310. Rather, it may represent only those paths for which an actual wireless commerce transaction has been reported. This effective filtering by usage may result in a more compact representation of graph 300, and as described below, may facilitate various types of analysis that may be performed on graph 300.

Generally speaking, a representation of graph 300 may encompass any suitable data structure, such as a table, tree, etc. In some embodiments, the representation may be generated and stored by code executable on WCTAS 100. For instance, WCTAS may generate and store a representation of graph 300 within data store 105. It is contemplated that any use of or operation on a representation of graph 300, such as any of the various types of analysis or use described below, may also be implemented by code configured to generate and store the representation, and may be executable by various systems as just described. Alternatively, such application code may be implemented by a distinct code module or element that may be configured for execution on a system distinct from the system that generates the representation. For example, in one embodiment WCTAS 100 may be configured to generate a representation of graph 300 and to convey the representation to another system (e.g., targeted advertising system 110), which may be configured to independently execute code implementing algorithms to analyze or process the representation on behalf of a particular user. In some embodiments, it is contemplated that WCTAS 100 may be configured to generate the representation of graph 300 from wireless commerce transaction information reported by transaction reporters 140. For example, wireless commerce transaction information reported by transaction reporters 140 may indicate that two or more transactions have been completed by a mobile communication device user within a given session. In one embodiment, WCTAS 100 may be configured to analyze such relationships in order to infer the structure of graph 300 from wireless commerce transactions.

As mentioned above and shown in FIG. 3, numerous paths may exist within graph 300. However, different paths may vary, sometimes substantially, with respect to various measures of path usage. In some embodiments, a representation of graph 300 may include indications of weights along the paths between transactions 310, where the weights may reflect any suitable measure of transaction activity of the corresponding path. For example, paths between certain transactions 310 may be established by a high volume of different users relative to paths between other transactions 310. In one embodiment, a measure of path volume, such as a number of instances a path is established per unit of time, may be assigned as a weight of that path. Alternatively, some paths through graph 300 may exhibit a substantial rate of change relative to other paths. Correspondingly, in one embodiment a time rate of change of the number of instances a path is established may be assigned as a weight of that path.

It is contemplated that in some embodiments, path weights may be determined as functions of various factors. In some embodiments, path weights may be determined according to corresponding how many times a path has been established by mobile communication device users. In some particular embodiments, path weights may be determined according to a time rate of change with respect to the establishment of paths between transactions, although a time rate of change need not necessarily be employed. In some embodiments, the number of times a path has been established and a rate of the establishment of paths may each contribute to a portion of a given path weight, in a linear or nonlinear fashion. Also path weights between transactions may exhibit decay over time, such that in the absence of the establishment of a given path by users of mobile communication devices, the path's weight may approach or achieve a minimum value. It is noted that path weights may have an arbitrarily complex functional definition. However, without loss of generality, simple integer weights generally indicative of path use will be used to simplify the following discussion. That is, larger numbers may be indicative of a greater degree of path use, weighted rate of change of path use, etc., while smaller numbers may be indicative of lesser degrees of path use. As an example, the graph of FIG. 3 is reproduced in FIG. 4 with path weights.

For a given mobile communication device user that completes a given transaction 310, path weight information may be used in generating a prediction of a future action to be performed by the user from the set of transactions 310 immediately referenced by the given transaction 310. For example, referring to FIG. 4, path weights may be used to rank the paths from transaction 310a in decreasing order, such that transaction 310b ranks highest, followed by transactions 310d and 310c. Thus, a targeted advertisement system, such as targeted advertisement system 110, may be offered such a ranked list as a set of predictions of future actions to be performed (e.g., transactions that are likely to be completed) by a given mobile communication device user. It is noted that a ranking of transactions according to path weights from a particular transaction may differ from the ranking of transactions according to the overall occurrence of a transaction. For example, the overall occurrence of a transaction may take into account the occurrence of a transaction without regard to which other transactions that users have completed within the same session, while path-oriented weights specifically take into account transactions that have performed within a same session.

While ranking path weights of paths between transactions 310 relative to a given transaction 310 may offer an accurate prediction as to which transaction a given user might complete next, additional recommendations regarding transactions 310 that a given user might complete in the future may be derived by extending path ranking and evaluation to aggregate paths of graph 300. In some embodiments, aggregate paths through graph 300 may be identified and ranked according to aggregate path weights. Such a ranking may be used, for example, to determine potentially interesting transactions 310 that are topologically distant from transactions 310 which such users may be currently completing (e.g., more than one path removed from a completed transaction 310). Further, in some circumstances it may be the case that the interest or value to a user of a particular set of transactions 310 may be enhanced if those transactions are completed in a particular order, via a particular aggregate path. That is, in some cases, a user's interest associated with a group of transactions 310 may be state-dependent. For example, a mobile communication device user that is interested in cycling might begin a session by completing a transaction including purchasing an introductory cycling book at a bookstore. After determining from the cycling book a type of bicycle to purchase, the mobile communication device user may complete a subsequent transaction by purchasing such a bicycle at a bike store. This type of state dependence may be reflected in path weight information. For example, in some embodiments, an aggregate path between two transactions 310 in one direction may have a higher aggregate weight than a corresponding aggregate path in the reverse direction.

Generally speaking, an aggregate path weight may be determined according to any suitable function of the individual weights corresponding to the paths comprising the aggregate path. For example, an aggregate path weight may be determined by simply summing the weights of the aggregate path's components. However, more sophisticated functions may be employed. In one embodiment, the influence of individual path weights in an aggregate path weight may decay as paths become more topologically distant from the origin of the aggregate path. For example, decay may be defined according to a step function, where only the first N paths weights are included in the aggregate path weight, a linear decay function, an exponential decay function, or any other suitable function or combination thereof (It is noted that the decay of path weight influence according to topological distance may be orthogonal to the decay of path weights themselves over time. Either technique may be employed independently or in combination.) Generally speaking, like path weights, aggregate path weights may also correspond to time rates of change of path use.

Multiple aggregate paths may exist between any two transactions 310 within graph 300. For example, in the embodiment shown in FIG. 4, there are fifteen distinct aggregate paths between transactions 300a and 300k. In the following discussion, an aggregate path may be denoted by concatenating the suffix letters of the transactions 310 traversed by the path. Thus, for example, the aggregate path traversing transactions 310a, b, f, h and k may be referred to as path ABFHK.

As mentioned previously, some aggregate paths may have greater potential interest or utility to a user than other aggregate paths, as indicated by corresponding aggregate path weights. In one embodiment, a particular aggregate path between two transactions 310 may be selected such that its aggregate path weight satisfies an optimization criterion. That is, the selected aggregate path may be distinguished from other aggregate paths on the basis of some aspect of its aggregate path weight. In various embodiments, different types of optimization criteria may be employed, taking account the format in which weights are represented as well as the overall goal of the selection. For example, an optimization criterion may specify that the selected aggregate path should have a weight that is maximal relative to other aggregate path weights. However, in other embodiments an optimization criterion may alternatively specify, for example, that the weight of the selected aggregate path should be minimized relative to other aggregate path weights, or should have a weight that is closest among other aggregate path weights, in absolute terms, to some target weight value, or which equals the target weight value within an absolute or relative threshold of equality (e.g., an absolute weight value or a percentage of the target weight value).

Thus, for example, in an embodiment where higher aggregate path weights indicate greater overall transaction completions, rate of change of transaction completions, or another metric of transaction interest, a "best" aggregate path among a group of aggregate paths in terms of potential transaction interest may correspond to the aggregate path having the highest aggregate path weight, while the "worst" aggregate path may have the lowest aggregate path weight among the group. For simplicity of reference, an aggregate path selected such that it satisfies an optimization criterion may be referred to as an optimal aggregate path, or simply an optimal path, regardless of the "good or bad" valence of the optimization criterion. Further, it is noted that the notion of a path being "best," "worst" or optimal in some other regard may be a context-dependent, relative consideration rather than an absolute, global determination. For example, what constitutes a best or worst path may vary depending on the metrics that form the basis for path weighting and the desired goal resulting from selection on the basis of an optimization criterion. Additionally, in some instances, multiple aggregate paths may satisfy a given optimization criterion. For example, a threshold aggregate path weight may be employed, such that any aggregate path having a weight exceeding the threshold may be considered optimal. Alternatively, aggregate paths may be ranked by weight, with a given number of top paths being considered optimal. In other embodiments, if multiple aggregate paths are deemed optimal according to the optimization criterion in use, further filtering or optimization of these aggregate paths may be performed on the basis of secondary optimization criteria, such as path length, secondary measures of traffic volume, or other criteria that may be relevant in distinguishing levels of transaction interest.

Determining which aggregate path or paths between two transactions 310 satisfy a given optimization criterion relative to a set of possible aggregate paths within graph 300 may be a computationally nontrivial task. In some instances, an optimal aggregate path may not include a given (or even any) locally optimal path between a given pair of transactions 310. For example, according to one embodiment, path ACEJK of FIG. 4 has an aggregate path weight of 15 and is the optimal path between transactions 300a and 300k within graph 300. However, it is noted that even though path ACEJK is optimal in this context, the path between transactions 310a and 310b has a higher weight than the path between transactions 310a and 310c, which is included in the optimal path. Thus, determining an optimal aggregate path may not simply be a function of choosing the optimal individual path at each level within graph 300.

Figure 5:
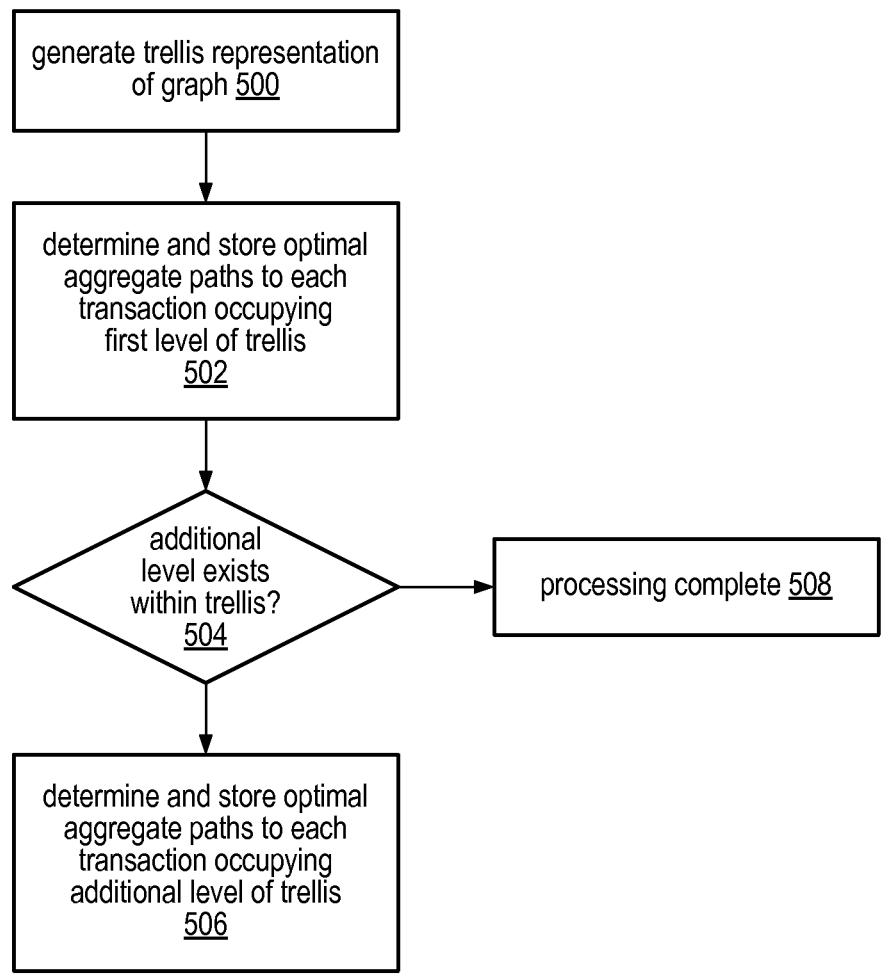
FIG. 5 illustrates a flowchart of a method for determining an optimal path given a graph of transactions, according to some embodiments.

In some embodiments, an optimal aggregate path may be identified by exhaustively computing the aggregate path weights for each possible aggregate path and then ranking the resulting weights according to an optimization criterion. However, the total number of aggregate paths may grow exponentially as the number of transactions 310 within a graph 300 increases. Thus, an exhaustive search may be computationally expensive for large graphs 300. Alternatively, any suitable algorithm for determining an optimal path through a weighted graph, such as a Viterbi algorithm, for example, may be employed. One embodiment of a method of determining an optimal aggregate path between two transactions 310 is illustrated in FIG. 5. In some embodiments, such a method may be implemented by WCTAS 100 and performed on a representation of a graph 300 derived from reported wireless commerce transaction information (e.g., such as data stored in data store 105), such as described above. In the illustrated embodiment, operation begins in block 500 where a trellis representation of graph 300 is generated. Generally speaking, a trellis representation of a graph 300 may be include multiple levels indicative of the number of paths required to reach a transaction 310 according to a particular aggregate path. Transactions 310 that are accessible via multiple aggregate paths of differing lengths may appear in multiple levels of the trellis.

Figure 4:
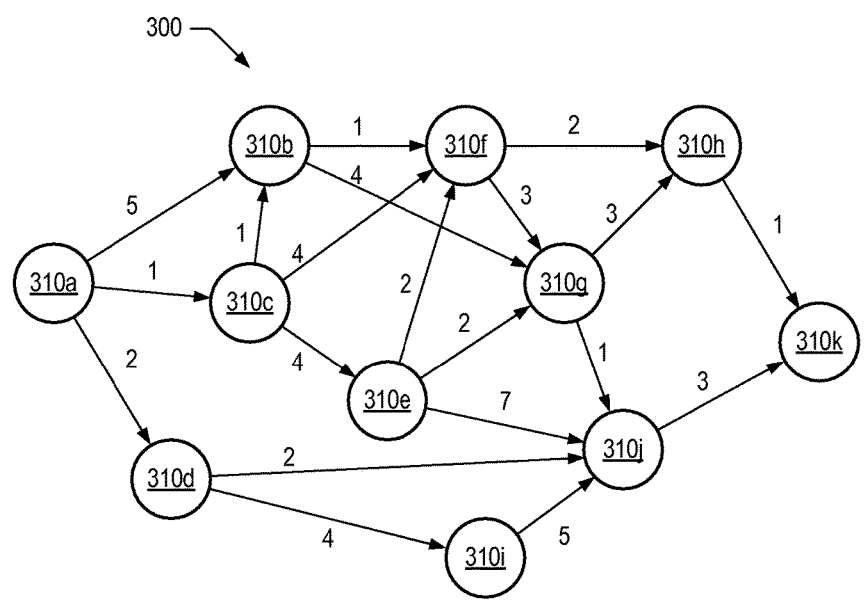
FIG. 4 illustrates a weighted representation of a transaction graph, according to some embodiments.
Figure 6:
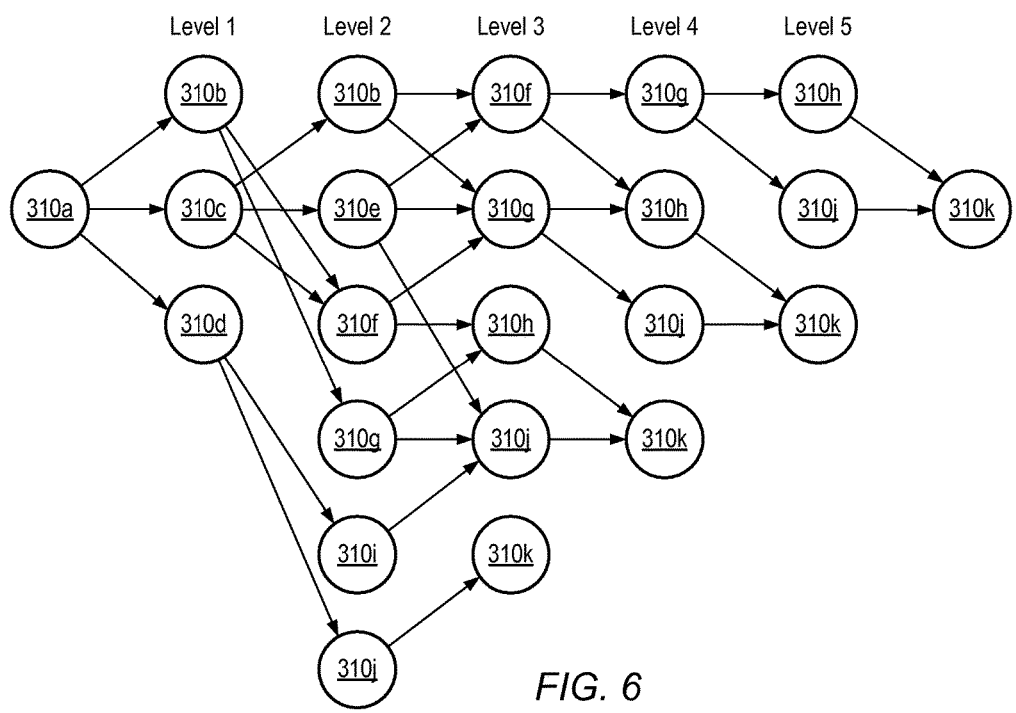
FIG. 6 illustrates a representation of optimal paths of a transaction graph, according to some embodiments.

One example of a trellis representation of graph 300 of FIG. 4, with respect to aggregate paths between transactions 310a and 310k, is shown in FIG. 6. In the illustrated embodiment, level 1 includes those transactions that have been accessed via aggregate paths including one path from transaction 300a, level 2 includes those transactions that have been accessed via aggregate paths including two paths, and so forth. For example, transaction 310b appears in both level 1 and level 2 because according to graph 300, it is has been completed subsequent to transaction 310a both directly and subsequent to transaction 310c. For clarity, the path weights shown in FIG. 5 are not shown in the trellis of FIG. 6, but may be encoded within a data structure representative of the trellis.

Referring again to FIG. 5, following generation of a trellis representation, operation continues in block 502, where the optimal aggregate path to each of the transactions 310 occupying the first level of the trellis are determined and stored. By definition, there exists only one respective path from the origin transaction (transaction 310a in FIG. 6) to each of the transactions 310 occupying the first level of the trellis, so this respective path is the optimal path to the corresponding first-level transaction 310.

If another level exists within the trellis (block 504), then an optimal aggregate path is determined and stored for each transaction 310 within that level (block 506), and processing may continue from block 504. If no additional levels exist within the trellis, processing is complete, with the optimal aggregate paths to each transaction 310 at each level of the trellis having been determined and stored (block 508). In some instances, graph 300 may include cyclic paths in which a given transaction 310 appears multiple times. In some embodiments, the method of FIG. 5 may be modified to detect and exclude cycles from the optimal aggregate path analysis. For example, if a path is determined to be cyclic, processing of the path may halt and it may be eliminated from the trellis. Alternatively, cyclic paths may be excluded from trellis generation prior to the determination of optimal aggregate paths. Also, in some embodiments, processing of optimal aggregate path information for a given path may terminate before the final level of the trellis has been reached. For example, a path may be considered terminated if a path weight along the path falls below a particular threshold value.

In determining the optimal aggregate path for a given transaction 310 within a given level, one or more transactions 310 in the previous level may have paths to the given transaction 310. However, only the previously determined optimal aggregate path for each of these transactions 310 in the previous level needs to be taken into account. That is, for any given transaction 310 in some level of the trellis, one or more transactions 310 in the previous level may have a path to the given transaction 310. In turn, each of these transactions in the previous level may have multiple different paths from the origin transaction 310. However, only some of these multiple paths may be optimal, and the optimal aggregate path to a transaction 310 in a succeeding level will be an extension of an optimal aggregate path to some transaction 310 in a previous level.

As an example, consider FIG. 6. In level 1 of the trellis, the optimal paths for transactions 310b-d are simply the paths from transaction 310a, having weights of 5, 1 and 2, respectively. In level 2 of the trellis, only transaction 310f has two possible paths from level 1: path BF and path CF. Since paths BF and CF have respective weights 1 and 4, in one embodiment the aggregate path weights for aggregate paths ABF and ACF, taken as the sum of the component paths, are 6 and 5, respectively. Since aggregate path ABF has the higher weight, it may be considered the optimal aggregate path to transaction 310f in level 2 and stored as such.

Considering level 3 of the trellis, transaction 310g has three possible paths from level 2: paths BG, EG and FG. In the illustrated embodiment, only one aggregate path exists through each of transactions 310b and 310e in level 2: paths ACB and ACE, respectively. While two aggregate paths exist to transaction 310f, path ABF was previously determined to be the optimal one of the two. Thus, path ACF may be disregarded in considering the optimal path to transaction 310g in level 3, reducing the overall computation requirement relative to the exhaustive path evaluation approach mentioned above. Based on these considerations, the candidate aggregate paths to transaction 310g are paths ACBG, ACEG and ABFG having aggregate path weights 6, 7 and 9, respectively. Since aggregate path ABFG has the highest weight of the three, it is stored as the optimal path to transaction 310g in level 3.

It is noted that in some embodiments, thresholds, decay or other functions may be applied to aggregate paths and their associated weights during the operation of the method of FIG. 5. For example, aggregate path lengths may be explicitly limited to a certain number of paths, which may be implemented by limiting the number of levels of the trellis that may be considered. Alternatively, a minimum path length requirement may be enforced. Additionally, decay functions may be applied to individual path weights within the trellis as a function of the level of the trellis where the weight occurs, or according to any other suitable function. Any combination of these techniques may also be employed.

Once complete, application of the method of FIG. 5 may result in a data structure that reflects the optimal aggregate paths from an origin transaction 310 to each transaction 310 at each level within the trellis. If a given transaction 310 appears in more than one level (e.g., transaction 310b appears within levels 1 and 2 of FIG. 6), the overall optimal aggregate path to that transaction may be determined from among the several computed entries. For example, the most heavily weighted, longest, or shortest path to the given transaction 310 may be selected, or another selection criterion may be employed. In some embodiments, the optimal aggregate path from the origin transaction 310 to any transaction 310 within graph 300 may also be explicitly identified. That is, rather than identifying an origin transaction 310, a particular destination transaction 310, and using the optimal aggregate path results to determine the optimal aggregate path between them, the optimal aggregate path results may be used to determine which destination transaction or transactions 310 have an optimal aggregate path from the origin, relative to all the transactions within graph 300.

Optimal aggregate path information may have several applications. It is noted that in general, individual and aggregate path weight information may be derived from actual mobile communication device user transaction behavior with respect to transactions 310. Aggregate path information that takes user-driven transaction behavior into account may serve as an indication of interest in the transactions 310 referenced by the path. Thus, instead of or in addition to predicting specific transactions that a user is likely to complete, in some embodiments WCTAS may be configured to predict an optimal aggregate transaction path including a sequence of future transactions that a user is likely to complete.

For example, in one embodiment WCTAS 100 may be configured to identify a transaction 310 that a mobile communication device user has completed. (Alternatively, WCTAS 100 may be configured to identify a series of transactions that a mobile communication device user has completed.) WCTAS 100 may then determine optimal aggregate path information from a representation of graph 300 using any of the various techniques described above. Based on the determined optimal aggregate path information, WCTAS 100 may generate a prediction of a future action to be performed by the mobile communication device user based on one or more transactions 310 of the determined optimal aggregate path or characteristics of such transactions. As described above, each transaction 310 may have one or more characteristics, such as a user identifier, a device identifier, payment information, item identifiers, a timestamp, information identifying the location of commerce at which the transaction is completed, information indicating the physical location of the location of commerce at which the given transaction is completed, and/or other information about a given transaction. Accordingly, WCTAS 100 may be configured to generate a prediction of a future action to be performed by the mobile communication device user based on one or more of such characteristics. For example, WCTAS 100 may predict (including but not limited to): that a mobile communication device user will purchase a particular item (e.g., identified by SKU or another identifier), that the user will visit a particular location of commerce, that the user will purchase a particular item at a particular location of commerce, that the user will purchases a particular item irrespective of the particular location of commerce at which the item is to be purchased, that a user will visit a particular location of commerce irrespective of which type of (if any) item the user will purchase at such location of commerce, that a user will spend a particular amount of money or other funds on an item, and/or that a user will utilize a particular type of payment method to purchase an item. In various other embodiments, other predictions may be generated based on characteristics of one or more transactions of an aggregate optimal path.

As mentioned above, in some circumstances an ordered completion of the transactions of an aggregate path may be significant to a user's deriving maximum utility from the transactions 310 along the path. In other circumstances, a user may be more interested in directly completing a transaction 310 that is at or near the end of an optimal aggregate path, or somewhere along the path, bypassing some intervening transactions 310 along the way. For example, a user may begin a session by completing a particular transaction 310 with a specific goal in mind. The various aggregate paths originating at the particular transaction 310 may be projections towards transactions 310 that might satisfy the user's goal. That is, those aggregate paths might constitute predictive information regarding transactions 310 that might be useful to the user. Correspondingly, in some embodiments plugin WCTAS 100 may be configured to employ aggregate path information to make specific predictions regarding transaction 310.

It is noted that in some embodiments, path weight information, and consequently optimal aggregate path information, may evolve over time, for example as user transaction completion patterns change, weights decay, etc. It is also noted that dynamically exposing path information derived from completed transactions may facilitate self-organization of an otherwise chaotic or disorganized collection of transactions 310. For example, users presented (e.g., by targeted advertisement system 110) with dynamic indications of potentially interesting paths may be more likely to complete transactions 310 along those paths, which may reinforce the weighting of those paths still further. By contrast, paths or transactions 310 that become less interesting or relevant may correspondingly see their weights decline over time, becoming less likely to be selected by users presented with dynamic path information (e.g., by targeted advertisement system 110). In particular, it is noted that such organization of transactions may in some instances be entirely driven by completed transactions, and may be performed, e.g., by software executable by WCTAS 100 or another system without need of manual intervention to rate or rank transactions or paths.

Targeted Advertisements

As described above, WCTAS 100 may be configured to generate a prediction of a future action to be performed by a user of a mobile communication device. WCTAS 100 may provide indications of such predictions to a targeted advertisement system, such as targeted advertisement system 110. In some embodiments, targeted advertisement system 110 may be owned, operated, or controlled by an entity other than an entity that owns, operates, or controls WCTAS 100. For example, targeted advertisement system may be owned, operated, or controlled by an advertiser that subscribes to the generated predictions provided by WCTAS 100. In such example, an entity controlling targeted advertisement system 100 may compensate an entity controlling WCTAS 100 for such predictions. In other embodiments, targeted advertisement system 110 may be owned, operated, or controlled by the same entity that owns, operates, or controls WCTAS 100. In some cases, targeted advertisement system 110 and WCTAS 100 may be implemented as a single, integrated system.

Targeted advertisement system 110 may be configured to generate one or more targeted ads based on the predictions provided by WCTAS 100. For example, as described above, WCTAS 100 may generate a prediction that a mobile communication device user will purchase a particular item. Based on such prediction, targeted advertisement system 110 may generate a targeted advertisement. For instance, the targeted advertisement system 110 may generate a targeted advertisement that indicates a discount or other promotional offer for the particular item. Alternatively, the targeted advertisement system may generate a targeted advertisement that indicates a discount or promotional offer for a similar or competing item. For instance, such an advertisement may be generated to entice a mobile communication device user to try an alternative to the item that he/she would otherwise most likely purchase. In other cases, targeted advertisement system 110 may generate an advertisement that indicates a discount for a particular store, a particular item at a particular store, or any other advertisement based on a prediction generated by WCTAS 100.

Figure 7A:
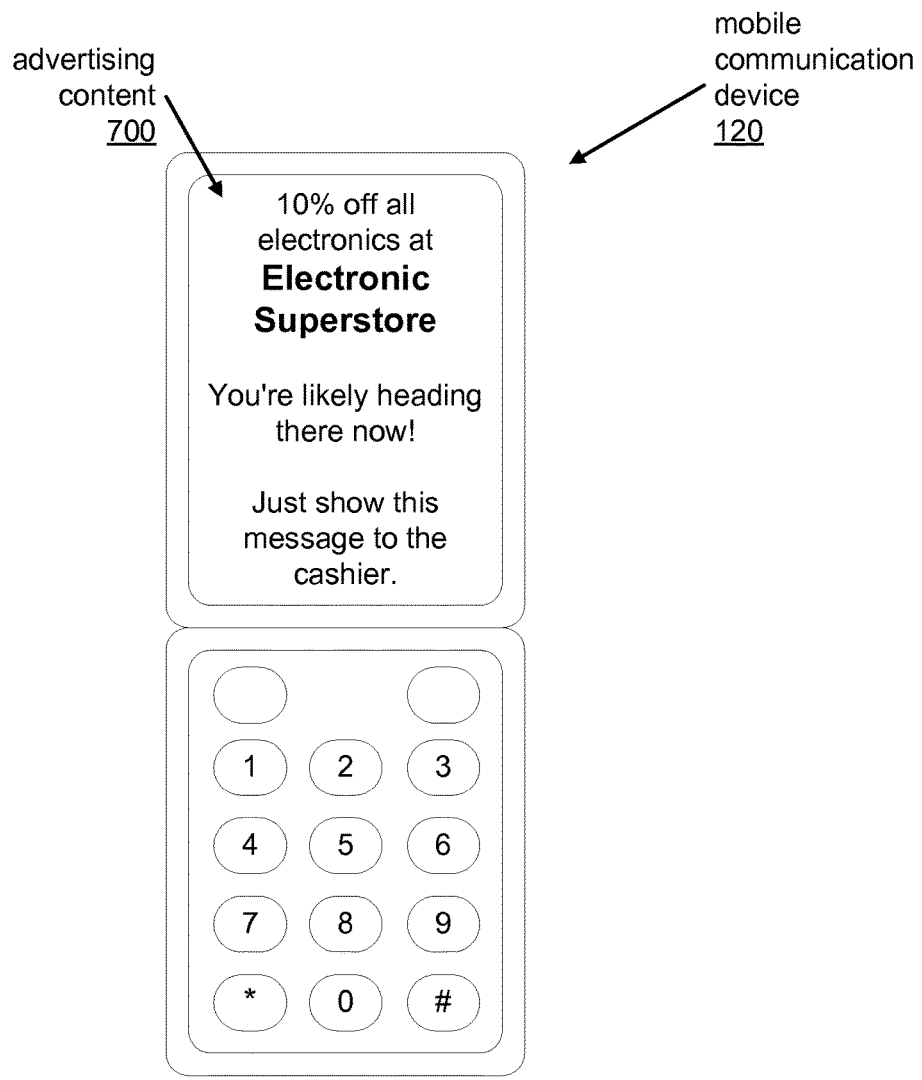
FIG. 7A illustrates an exemplary user-interface display on a mobile communication device, according to some embodiments.

Targeted advertisement system 110 may be configured to communicate such targeted advertisements to one or more mobile communication devices (e.g., mobile communication devices 120) for use by the users of such devices. FIG. 7 is a block diagram illustrating an example mobile communication device displaying advertising content generated based on one or more predictions from WCTAS 100 and delivered by targeted advertisement system 110, according to one embodiment. Targeted advertisement system 110 may in some embodiments send advertising content, such as an electronic coupon or other advertisement regarding a predicted next action to be performed by a mobile communication device user. Thus, mobile communication device 120 may receive from targeted advertisement system 110 advertising content 700, which may be an electronic coupon advertising special pricing at a location of commerce to which a mobile communication device user is predicted to travel. In some embodiments, advertising content 700 may be a text message, instant message, or graphic image sent to mobile communication device 110. As is well known, there are many ways in which information, such as advertising content 700, may be communicated to a mobile communication device. In some embodiments, mobile communication device 110 may be Internet or web enabled and system 100 may be configured to send advertising content 700 to mobile communication device 110 as an email message, URL, URI or other Internet-enabled communication protocol.

Additionally, information regarding the effectiveness of coupons, ads or other advertising content may be recorded and used, as least in part, when subsequently determining advertising content. For example, if a particular type or version of advertising content is never acted upon by the user receiving it, targeted advertisement system 110 may determine not to send that particular type or version of advertising content to mobile communication device users. Similarly, if a particular type or version of advertising content is acted upon by mobile communication device users, targeted advertisement system 110 may determine to send that particular type or version of advertising content to additional mobile communication device users when appropriate, according to some embodiments.

FIG. 7 illustrates advertising content 700 representing an electronic coupon offering a special price at a particular store, according to one embodiment. In other embodiments however, advertising content 700 may not represent a coupon, but instead may represent another advertisement, such as one directing the mobile communication device user to a particular location of commerce. While not illustrated in FIG. 7, in some embodiments, advertising content may not be visual in nature. For example, in one embodiment advertising content 700 may be an audio message, such as a pre-recorded or computer-generated recording, sent to mobile communication device 120.

In some embodiments, such as illustrated in FIG. 7, advertising content 700 may include instructions on how to take advantage of any special offers or deals mentioned in advertising content 700. For example, the mobile communication device user may need to show or play (e.g., in the case of audio-based advertising content) the advertising content on the mobile communication device to a cashier or other staff at the advertised location of commerce to obtain any advertised prices, offers or deals. In other embodiments, however, the mobile communication device user may only have to mention that they received advertising content 700 to receive any relevant special offers. Additionally, in some embodiments, advertising content 700 may include an indication that the mobile communication device user is already heading toward, or is likely to pass, the advertised location. In other embodiments, advertising content 700 may include directions to the advertised location.

Figure 7B:
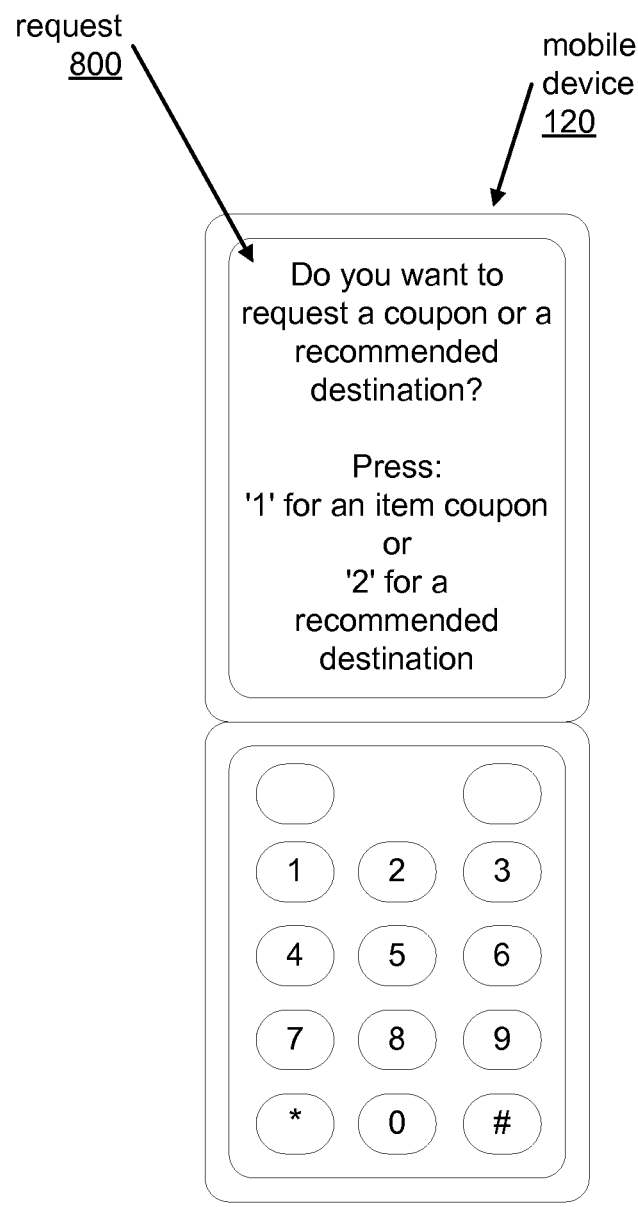
FIG. 7B illustrates another exemplary user-interface display on a mobile communication device, according to some embodiments.

In some embodiments, targeted advertisement system 110 may be configured to determine (e.g., from information received from WCTAS 100) a predicted destination (e.g., location of commerce) to which a user may travel, and possibly send advertising content for the determined predicted destination, in response to a request from a mobile communication device user. FIG. 7B illustrates an exemplary mobile communication device 120 displaying a user interface for allowing a user of the mobile communication device to request a coupon and/or recommended destination. In some embodiments, mobile communication device 120 may include software or firmware configured to allow the mobile communication device user to communicate a request to targeted advertisement system 110. FIG. 7B illustrates just one possible embodiment for a user interface that may be provided by custom software or firmware on a mobile communication device. FIG. 7B illustrates that mobile communication device 120 may be configured to communicate a request for advertising content or a recommended destination, or both, in many different manners, according to different embodiments.

In some embodiments, a mobile communication device user may be able to request advertising content (such as an electronic coupon) for use at the user's current location. For instance, a mobile communication device user may be browsing at a store in a shopping mall and request a coupon for the store. In response, targeted advertisement system 110 may be configured to provide advertising content to the mobile communication device user for use at the user's current location of commerce or locations of commerce to which the user is likely to travel, as described in more detail below.

In various embodiments, a mobile communication device user may request a recommendation for a destination likely to be of interest to the mobile communication device user. In response, targeted advertisement system 110 may be configured to determine one or more locations likely to be of interest to the mobile communication device user, such as based on other locations the user has recent visited, demographic information regarding the user, locations visited by other, similar mobile communication device users, and/or items previously purchased by the user. For example, if many other mobile communication device users categorized in a similar demographic segment as the requesting mobile communication device user have visited a certain location, targeted advertisement system 110 may recommend that location to the requesting mobile communication device user. In other embodiments, targeted advertisement system 110 may determine one or more user trails, such as by analyzing graph 300, and may recommend a location on the same trail or trails current used by the requesting mobile communication device user.

Additionally, a mobile communication device may also include a user interface allowing a user to set or specify various parameters related to receiving advertising content and/or recommended destinations, as described herein. For example, a mobile communication device 120 may include a user interface allowing a mobile communication device user to configure the number, type and frequency of coupons received, according to one embodiment. For instance, one mobile communication device user may desire to only receive coupons that were specifically requested while another user may desire to receive no more than one coupon an hour. Thus, a user may indicate a maximum frequency at which the user desires to receive advertising content. In addition, a user may be able to specify the types of coupons received. For instance, one user may only want to receive coupons for clothing and/or clothing accessories while another user may want to only receive coupons for restaurants and other food venues. Mobile communication device 120 may also be configured to allow the user to specify how the mobile communication device responds to communications from targeted advertisement system 110. For example, a special ring tone, vibration, or other notification may be used when advertising content and/or recommended destinations are received on the mobile communication device.

Mobile communication device 120 may also provide a user interface allowing the user to view and/or select from among multiple received coupons (or other advertising content). For example, mobile communication device 120 may display a list of advertising content and/or recommended destinations received to allow the user to review and/or select one of the previously received coupons or destinations. Additionally, targeted advertisement system 110 may be configured to communicate multiple recommended or predicted destinations or items to a mobile communication device user (e.g., based on the user's current and/or previous locations or items purchased) and the mobile communication device may include a user interface to display a list of the recommended destinations or items. The list of destinations or list of items may be ranked by targeted advertisement system 110 and/or mobile communication device 120 based on various criteria and/or parameters, such as user parameters (e.g., what type of destinations the user desires to visit), advertising cost (e.g., advertisers may pay more to be higher in the list), proximity to user's current location (e.g., along paths of graph 300), among others. In one embodiment, targeted advertisement system 110 may be configured to continually update such a list of items or destinations based on the user's transaction history. Thus, targeted advertisement system 110 may modify or update the list, either adding or removing suggested items or destinations, as the user performs various transactions at various locations of commerce.

Mobile communication device 120 may include a user interface allowing the user to review and select from among recommended items or destinations, according to some embodiments. For example, mobile communication device 120 may display a dynamically changing list of recommended items or destinations and may allow the user to select one of the items or destinations. In response to user selection of a recommended destination, mobile communication device 120 may inform targeted advertisement system 110 of the user selection or may request additional information, such as advertising content, for the selected item or destination. In one embodiment, system 100 may communicate advertising content for at least some of the recommended items or destinations when initially communicating the recommended items or destinations to mobile communication device 120. Additionally, targeted advertisement system 110 may communicate advertising content to mobile communication device 120 in response to a user selecting a recommended item or destination.

Mobile communication device 120 may also be configured to allow the user to filter recommended items, destinations and/or advertising content via a list of recommended items or destinations. For example, in one embodiment, a user may be able to select a particular item or destination and specify that the user wish to no longer receive advertising content for the selected item or destination in the future. Alternatively, a user may request to receive additional recommended items, destinations and/or advertising content for items or locations of commerce similar (e.g., the same type of item, store, restaurant, etc.) to a selected item or destination. Mobile communication device 120 may then communicate the user's preferences and/or requests to targeted advertisement system 110 and targeted advertisement system 110 may, in some embodiments, ensure that future advertising content and/or recommended items or destinations are consistent the user's preferences. In other embodiments, mobile communication device 120 may be configured to filter advertising content and/or recommended items or destinations in accordance with user preferences.

When determining a recommended or predicted item and/or destination for a mobile communication device user, targeted advertisement system 110 may take into account an interest level of different potential items or destinations to the mobile communication device user, according to some embodiments. For example, the interest level of different items may be determined on the basis of actual purchases of items by mobile communication device users, in some embodiments. In other words, an item that is frequently purchased by mobile communication device users may be considered more interesting than an item that is purchased less often. In some embodiments, interest associated with items may be determined according to the behavior of people purchasing that item. For example, interest may be associated with the general interest of a community of people for whom at least some degree of desire or curiosity is implicit in their acts of purchasing an item. By associating a measure of item interest with actual user behavior, item interest may be determined dynamically. Indicated item interest may then rise and fall according to traffic patterns that may reflect emergent properties of a community of users. Thus, in some embodiments, targeted advertisement system 110 may recommend items with a higher measure of item interest than items with lower levels of interest.

In various embodiments, since the predictions generated by WCTAS 100 may include an optimal path of future actions to be performed by a mobile communication device user, multiple targeted advertisements may be generated corresponding to such optimal path (e.g., one targeted ad for each future action of the optimal path). In some cases, the optimal path of future actions may span multiple locations of commerce or merchants. For instance, WCTAS 100 may predict that the user will purchase a television from an electronics store and an entertainment credenza on which to place the television from a furniture store. In some embodiments, in order to have target ads generated for their locations of commerce, merchants may be required to subscribe to a targeted ad service provided by targeted ad system 110. In the above example, if the electronics store is not subscribed to such targeted ad service whereas the furniture store is subscribed to such targeted ad service, a targeted ad may be generated corresponding to the credenza of the furniture store (but not the television of the electronics store) even though purchasing the credenza is represented by a point further along the optimal path than the point representing the television purchase.

Figure 8:
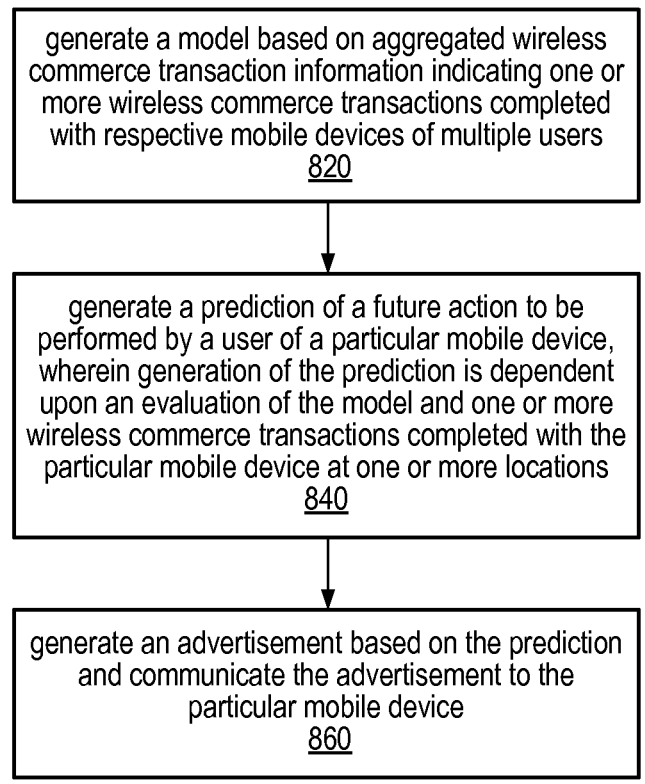
FIG. 8 illustrates a flowchart of a method for generating a prediction of future action to be performed by a user, according to some embodiments.

FIG. 8 illustrates an exemplary flowchart of a method for generating a prediction of a future action to be performed by a user of mobile communication device and an advertisement based on such prediction. In various embodiments, WCTAS 100 described herein may be configured to perform the method illustrated by the flowchart of FIG. 8. As illustrated by block 820, the method describe herein may be employed by the wireless commerce transaction analysis system and/or the targeted advertisement system described herein. The method begins by generating one or more models based on aggregated wireless commerce transaction information indicating one or more wireless commerce transactions completed with respective mobile communication devices of multiple users. Additionally, such wireless commerce transaction information may indicate one or more characteristics of one or more of the completed transactions. For example, such characteristics may include but are not limited to a user identifier that identifies the mobile communication device user (e.g., a name or identification number such as customer number, driver's license number, or some other identifier). Such characteristics may also include a device identifier of the mobile communication device used to complete a given transaction (e.g., a phone number, serial number, International Mobile Equipment Identity number, or some other identifier). Such characteristics may also include payment information associated with the transaction (e.g., payment amount, credit account numbers, charge account numbers, bank account numbers, routing numbers, amount of funds to be withdrawn for remuneration, etc.). Such characteristics may include item identifiers that identify items (e.g., property or services) exchanged in the given transaction, such as SKUs, UPCs, EANs, GTINs, part numbers, or other identifiers suitable for identifying an item. Such characteristics may also include a timestamp that indicates the time at which a given transaction is completed. Such characteristics may also include an identifier that identifies the location of commerce at which the transaction is completed (e.g., a store name, store number, or some combination thereof). Such characteristics may also include information that indicates the physical location of the location of commerce at which the given transaction is completed (e.g., an address of a store or establishment, geographic coordinates, etc.).

In various embodiments, the wireless commerce transaction information may include one or more characteristics that indicate the direction of travel according to which the mobile device user is traveling. For instance, in one embodiment, the user's mobile device may include a navigation component configured to determine and report the direction of travel to the transaction reporters described herein (e.g., during a transaction). In various embodiments, the navigation component may employ the global positioning system (GPS) or other positioning technology to determine the direction of travel of the user. For instance, based on two or more locations (e.g., as identified by coordinates), the navigation component may be configured to determine the direction of travel of the user. In other cases, the navigation component might be configured to utilize cell phone tower triangulation or an electronic compass component to determine the direction of travel (e.g., North, South, East, West or some combination thereof).

In various embodiments, the generated model(s) may be a collection of aggregated wireless commerce transaction information. However, in other cases, the generated model(s) may include one or more analyses, computations, or evaluations of such wireless commerce transaction information. For instance, in one embodiment, the generated model(s) may include the representation of graph 300 described above. As described above, in various embodiments, generating a model may include performing the method of FIG. 5 or any suitable algorithm for determining an optimal path through a weighted graph, such as a Viterbi algorithm. In some embodiments, other analyses of wireless commerce transaction information, such as stochastic or regression analysis, may be employed while remaining within the spirit and scope of various embodiments.

As illustrated by block 840, the method may include generating a prediction of a future action to be performed by a user of a particular mobile device; such generation may be dependent upon an evaluation of the model(s) and one or more wireless commerce transactions completed with the particular mobile device at one or more locations. For example, generating a prediction may include determining that a mobile communication device user has completed one or more wireless commerce transactions at one or more locations of commerce. For instance, the method may include WCTAS 100 monitoring the transactions of a given user as determined by user identifiers included in reported wireless commerce transaction information. In some embodiments, the determination that a user has completed one or more wireless commerce transactions at one or more locations of commerce may be session-specific. In other words, in some cases, only wireless commerce transactions completed during a given session (as described above) may be used as the basis for generating a prediction. As indicated by the illustrated embodiment, the one or more transactions determined to have been completed by a given mobile communication device user may be used as the basis (in combination with an evaluation of the predictive model(s), described in more detail below) for generating a prediction. For example, the method may include monitoring a given user's wireless transactions as the user traverses through a shopping district and using wireless commerce transaction information about such transactions as the basis for a generated prediction.

As described above, generating the prediction may further include evaluating any of the various models described above. In various embodiments, evaluating a model may include comparing the one or more wireless commerce transaction completed with the mobile device of the particular user to the generated model(s). For instance, as described above, a given transaction or series of transactions may be utilized to determine one or more future actions to be performed by a user as illustrated by the determination of optimal paths (see e.g., FIGS. 5 and 6). In other embodiments, generating the prediction may include other analyses of wireless commerce transaction information, such as stochastic analysis, regression analysis, Bayesian analysis, the Viterbi algorithm, or any other suitable method for predicting future actions to be performed by a user. In various embodiments, the wireless commerce transactions completed by the given user (e.g., by monitoring incoming wireless commerce transaction information for data associated with a given user) may serve as the input of the evaluation of the predictive model(s). For example, the determined wireless commerce transactions completed by the given user may serve as the initial conditions for any of the various analyses, computations, or evaluations described herein. In some cases, predictions as to future actions to be performed by a given user of a mobile communication device may become more accurate as more initial conditions (e.g., as more wireless transactions completed by the given user) are reported.

In various embodiments, generating a prediction may include generating a prediction that indicates (including but not limited to): that a mobile communication device user will purchase a particular item (e.g., identified by SKU or another identifier), that the user will visit a particular location of commerce, that the user will purchase a particular item at a particular location of commerce, that the user will purchases a particular item irrespective of the particular location of commerce at which the item is to be purchased, that a user will visit a particular location of commerce irrespective of which type of (if any) item the user will purchase at such location of commerce, that a user will spend a particular amount of money or other funds on an item, and/or that a user will utilize a particular type of payment method to purchase an item.

As illustrated by block 860, the method may further include generating an advertisement based on the generated prediction and delivering the advertisement to the particular mobile device. For instance, generating such an advertisement may include generating any of the various advertisements described above, such as the advertisements of FIGS. 7A-7B. In general, the method may include generating any of the targeted advertisements described above with respect to the targeted advertisement section.

In various embodiments, the method may include generating additional or subsidiary actions based on a generated prediction of a future action to be performed by a user of a particular mobile device. In one example, the generated prediction may include a prediction that the particular user is going to purchase an item at a particular location of commerce. Based on such prediction, the method may include generating an additional prediction, such as a prediction that the user is going to drive a vehicle to the particular location of commerce. In various embodiments, the method may provide feedback to the user by sending one or more messages (e.g., text, voice, multimedia, etc.) to the mobile communication device of the particular mobile device user. Such feedback can inform the user of information based on the additional prediction. For example, based on the additional prediction that the user is going to drive a vehicle to a particular location of commerce, the method may include accessing real-time or projected traffic conditions and notify the user of traffic information pertaining to their route (e.g., average speed, collisions, etc.) or suggest optimal or alternate routes that lead to the location of commerce to which the user is predicted to travel. In another example, the additional prediction might include predicting that the user is going to walk to a particular location of commerce. Based on such additional prediction, the method may include accessing real-time or projected weather conditions and suggest one or more actions (e.g., "bring your umbrella") to the user via one or more messages (e.g., text, voice, multimedia, etc.) to the user's mobile device.

In some embodiments, the method may also (or alternatively) include generating the one or more predictive models from aggregated transaction data that does not necessarily include wireless commerce transaction information. For instance, in some embodiments, this may include generating a model based on aggregated transaction information for transactions occurring through electronic (but not necessarily wireless) payment methods including but not limited to credit card or electronic debit transactions. In such embodiments, the method may include generating a prediction in a manner similar to the manner described above with respect to block 840. However, in these cases, the generation of the prediction may be based on transactions that are not necessarily performed via wireless payment methods. In such embodiments, the method may include generating and communicating an advertisement based on the generated prediction to the particular mobile device of the user. The method may also include identifying the particular mobile device to send the generated advertisement based on information from the user's transactions (e.g., a user's name, account number, or other identifier). For example, WCTAS 100 may be implemented by a cellular telephone carrier that has access to records that match credit card numbers of mobile users to identifiers (e.g., telephone numbers, email addresses, or other identifiers) of such users' mobile devices. Accordingly, the method may include communicating information (e.g., a targeted advertisement) generated in accordance with the method described herein to mobile devices determined to be associated with users that perform transactions that are not necessarily wireless in nature.

System Configurations

The components of the system and method for generating predictions based on wireless commerce transactions may be configured according to a various system configurations, according to various embodiments. Some examples of such configurations are illustrated by FIGS. 9A-9C. As illustrated by enterprise system 900 of FIG. 9A, WCTAS 100 and targeted advertisement system 110 may in some embodiments be integrated as a single system. For instance, WCTAS 100 may generate predictions as described above, and targeted advertisement system 110 may generate advertisements based on such predictions received from WCTAS 100. As illustrated by merchant system 910 of FIG. 9A, transaction terminals and transaction reporters may in some embodiments be implemented as part of a merchant system at a merchant's location of commerce. For example, transaction terminal 130 may provide a transaction reporter with wireless commerce transaction information, and transaction reporter 140 may forward such information to WCTAS 100. In various embodiments, mobile communication devices 120 may send information to and receive information from the components of the system via communication towers 930, such as mobile, cellular and/or satellite communication towers, and mobile service provider 920, which provides mobile communication devices with access to various telecommunication networks. In various embodiments, the components of FIG. 9A (as well as FIGS. 9B-9C) may communicate to each other via one or more networks, such as network(s) 180. In various embodiments, network 180 may include one or more of a local area network (LAN) (e.g., an Ethernet or corporate network), a Wide Area Network (WAN) (e.g., the Internet), various types of telecommunications networks (e.g., cellular, satellite, etc.), or some combination thereof.

As illustrated by FIG. 9B, in some embodiments, transaction reporters 140 may be implemented with mobile communication devices 120. For instance, after a mobile communication device completes a transaction with a transaction terminal, the transaction report may report to WCTAS 100 wireless commerce transaction information via communication towers 930 and mobile service provider 920. Additionally, in the illustrated embodiment, mobile service provider 920 may control targeted advertisement system 110.

For instance, mobile service provider 920 may provide targeted advertisements as an exclusive service to its mobile communication customers. As illustrated by FIG. 9C, transaction reporters 140 may in some embodiments be implemented by mobile service provider 920. For instance, mobile service provider 920 may monitor transactions completed with mobile devices 120 and report corresponding wireless commerce transaction information to WCTAS 100. In this example, targeted advertisements are provided by a third-party advertiser 940. For instance, third party advertiser 940 may provide an advertising service that enables mobile communication device users to sign up for and receive targeted ads.

Exemplary System

Various embodiments of a system and method for generating predictions based on wireless commerce transactions, as described herein, may be executed on one or more computer systems, which may interact with various other devices. One such computer system is computer system 1000 illustrated by FIG. 10. Computer system 1000 may be capable of implementing WCTAS 100 and/or targeted advertisement system 110. While not illustrated for purposes of clarity, computer system 1000 (or a similar system) may be configured to implement any of the various components illustrated in FIG. 1. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing WCTAS 100 and targeted advertisement system 110 are shown stored within system memory 1020. In other embodiments, program instructions and/or data may be stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems (e.g., any of the various components of FIG. 1), or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
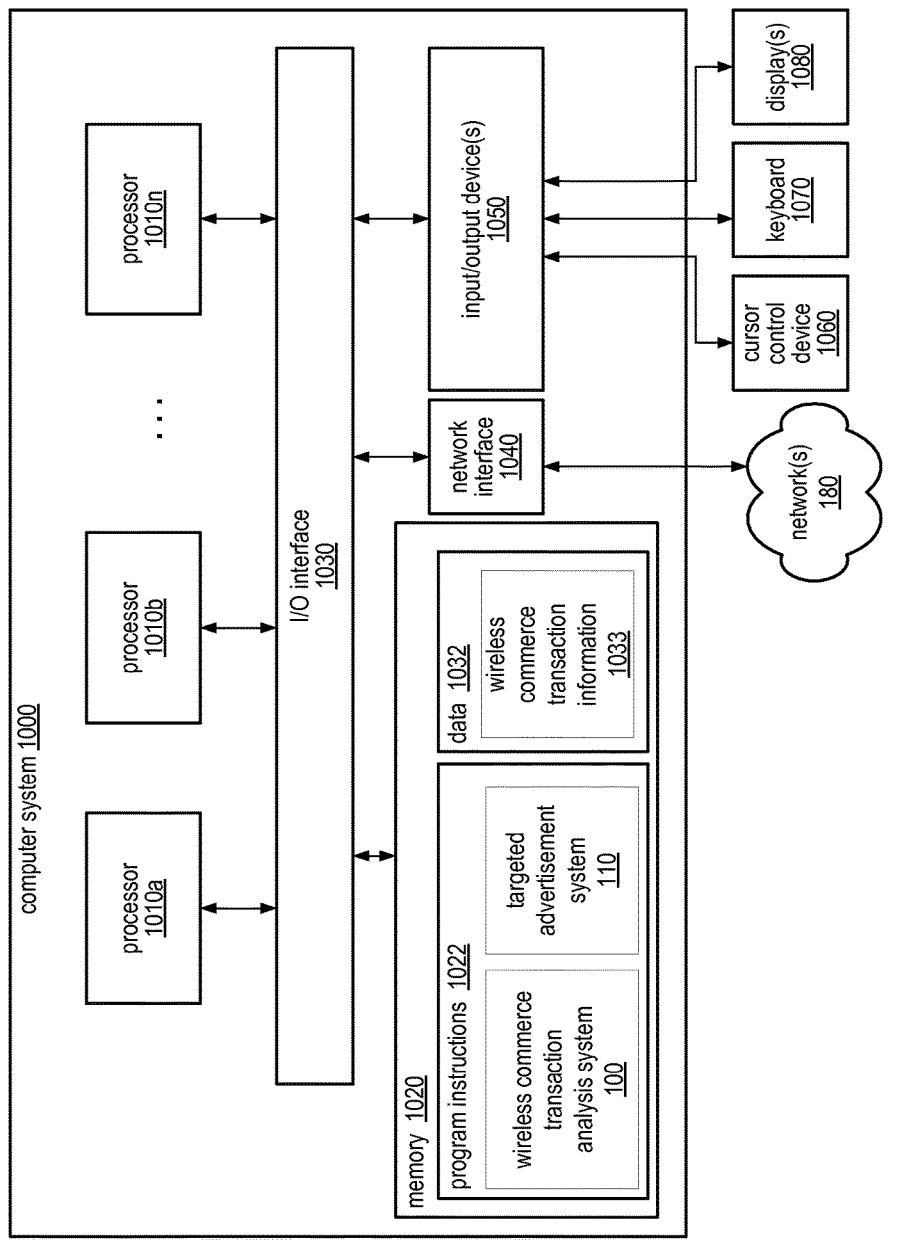
FIG. 10 illustrates an exemplary system for implementing a various components of the system for generating predictions based on wireless commerce transactions, according to some embodiments.

As shown in FIG. 10, memory 1020 may include program instructions 1022 configured to implement WCTAS 100 and targeted advertisement system 110. In one embodiment, WCTAS 100 and/or targeted advertisement system 110 may implement the methods described above, such as the methods illustrated by FIGS. 5 and 8. In other embodiments, different elements and data may be included.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Accordingly, various embodiments may be practiced with other computer system configurations.

The methods described herein may be implemented in software, hardware, or a combination thereof, in different embodiments. In addition, the order of the steps of the methods may be changed, and various elements may be added, reordered, combined, omitted, modified, etc. Various modifications and changes may be made as would be obvious to a person skilled in the art having the benefit of this disclosure.

These various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
    a network interface configured to receive wireless transaction data from one or more transaction reporters;
    a processor; and
    a memory coupled to the processor, wherein the memory comprises program instructions executable by the processor to:
        generate one or more models based on aggregated wireless transaction information indicating sessions that include respective sequences of multiple wireless transactions completed with respective mobile communication devices of a plurality of users, wherein for individual ones of the multiple wireless transactions, an identification number for a user of a mobile communication device and authentication information of the user is transmitted from the mobile communication device to a transaction terminal used for the wireless transaction when the mobile communication device is within a given proximity of the transaction terminal, and wherein the aggregated wireless transaction information is based at least on the wireless transaction data, wherein
    at least one wireless transaction of at least one of the sequences of wireless transactions is completed using a corresponding mobile device by a user of the mobile device, and wherein
    the generation of the one or more models comprises:
        determination of a plurality of paths from individual ones of said wireless transactions to respective other ones of said wireless transactions, wherein a given path from a transaction to another transaction is determined based on a given mobile device completing the other transaction within a given period of time after completing the transaction, and wherein individual paths of said plurality of paths have respective path weights, wherein a given path that has been established a greater number of times than another given path has a higher path weight than the other given path; and
        identification of optimal aggregate paths within the plurality of paths, wherein individual ones of the optimal aggregate paths comprises a series of two or more paths between different wireless transactions,
        wherein a given aggregate path is identified as an optimal aggregate path out of a plurality of aggregate paths between two wireless transactions by determining that a sum of individual path weights of the given aggregate path is higher than a sum of individual path weights of other ones of the aggregate paths, and wherein the other ones of the aggregate paths are identified as non-optimal aggregate paths,
        and wherein the one or more models comprises a representation of a graph of the plurality of paths, wherein the graph includes multiple levels, each level comprising one or more of said wireless transactions, and wherein to determine a given optimal aggregate path out of two or more aggregate paths to a particular wireless transaction of a given level, one or more aggregate paths previously determined to be non-optimal aggregate paths to one or more respective wireless transactions of a previous level are disregarded;
    generate a prediction of a future action to be performed by a user of a particular mobile communication device, wherein
    generation of the prediction is dependent upon an evaluation of the one or more generated models and a current session including a path representing a sequence of multiple wireless transactions completed with the particular mobile communication device, and
    the generation of the prediction comprises selection of the future action based at least in part on:
        the identification of the optimal aggregate paths between different ones of said wireless transactions, and
        a determination of the wireless transactions that have been completed with the particular mobile communication device;

determine, based on said prediction of the future action, information to transmit to the particular mobile communication device; and transmit, via a network, said determined information to the particular mobile communication device.

2. The system of claim 1, wherein the information communicated to the particular mobile communication device comprises an advertisement based on the generated prediction.

3. The system of claim 1, wherein to generate a prediction of a future action to be performed the program instructions are executable to generate a prediction as to an amount of money to be spent on an item by said user of said particular mobile device.

4. The system of claim 1, wherein said aggregated wireless transaction information indicates one or more wireless transactions completed via radio-frequency identification (RFID).

5. The system of claim 1, wherein to generate the one or more models based on aggregated wireless transaction information, the program instructions are executable to create said aggregated wireless transaction information from wireless transaction information reported by one or more transaction terminals.

6. The system of claim 1, wherein to generate the one or more models based on aggregated wireless transaction information the program instructions are executable to create said aggregated wireless transaction information from wireless transaction information reported by one or more of said respective mobile communication devices of the plurality of users.

7. The system of claim 1, wherein for individual ones of at least some of said wireless transactions, the generation of the one or more models comprises determination of one or more characteristics of the individual wireless transaction, wherein the one or more characteristics of the individual wireless transaction comprise one or more of: a user identifier identifying a user of the mobile communication device used to complete said individual wireless transaction, a device identifier identifying the mobile communication device used to complete said individual wireless transaction, payment information associated with said individual wireless transaction, an item identifier identifying an item exchanged in said individual wireless transaction, a timestamp indicating a time at which said individual wireless transaction is completed, an identifier identifying the location of at which the individual wireless transaction is completed, information indicating the physical location at which the individual wireless transaction is completed, or information indicating the direction of travel of the user of the particular mobile communication device.

8. The system of claim 7, wherein said item identifier comprises a stock keeping unit (SKU).

9. The system of claim 1, wherein to generate a prediction of a future action to be performed, the program instructions are executable to generate a prediction as to an item to be purchased by said user of said particular mobile device.

10. The system of claim 1, wherein to generate a prediction of a future action to be performed the program instructions are executable to generate a prediction as to a location of to be visited by said user of said particular mobile device.

11. A computer-implemented method, comprising:
performing, by one or more computers:
generating one or more models based on aggregated transaction information indicating sessions that include respective sequences of multiple transactions completed by a plurality of users, wherein one or more of said transactions is a wireless transaction completed using a corresponding mobile device by a user of the mobile device, and wherein the generation of the one or models comprises:
a determination of a plurality of paths from the wireless transaction to respective other ones of the wireless transactions, wherein a given path from the transaction to another transaction is determined based on a given mobile device completing the other transaction within a given period of time after completing the transaction, and wherein individual paths of said plurality of paths have respective path weights, wherein a given path that has been established a greater number of times than another given path has a higher path weight than the other given path; and identification of optimal aggregate paths within the plurality of paths, wherein individual ones of the optimal aggregate paths comprises a series of two or more paths between different wireless transactions, wherein a given aggregate path is identified as an optimal aggregate path out of a plurality of aggregate paths between two wireless transactions by determining that a sum of individual path weights of the given aggregate path is higher than a sum of individual path weights of other ones of the aggregate paths, and wherein the other ones of the aggregate paths are identified as non-optimal aggregate paths, and wherein the one or more models comprises a representation of a graph of the plurality of paths, wherein the graph includes multiple levels, each level comprising at least the wireless transaction or one or more of the other wireless transactions, and wherein to determine a given optimal aggregate path of two or more aggregate paths to a particular wireless transaction of a given level, one or more aggregate paths previously determined to be non-optimal aggregate paths to one or more respective wireless transactions of a previous level are disregarded;

identifying a mobile communication device based on transaction information of one or more other transactions completed by a particular user of the mobile communication device;

generating, by a processor of the one or more computers, a prediction of a future action to be performed by the particular user of the identified mobile communication device, wherein generation of the prediction is dependent upon an evaluation of the one or more generated models and a current session including a path representing a sequence of multiple transactions completed by the particular user, and wherein the generation of the prediction comprises selection of the future action based at least in part on:
the identification of the optimal aggregate paths between the wireless transaction and different ones of the other wireless transactions, and
a determination of the transactions that have been completed by the particular user of the identified mobile communication device;

determining, based on said prediction of the future action, information to transmit to the particular mobile communication device; and transmitting, via a network, said determined information to the identified mobile communication device.

12. The method of claim 11, wherein the information communicated to the identified mobile communication device comprises an advertisement based on the generated prediction.

13. The method of claim 11, wherein at least a portion of said aggregated transaction information comprises wireless transaction information.

14. The method of claim 13, wherein said wireless transaction information indicates one or more wireless transactions completed via radio-frequency identification (RFID).

15. The method of claim 11, wherein generating the one or more models based on aggregated transaction information comprises creating said aggregated transaction information from transaction information reported by one or more transaction terminals.

16. The method of claim 11, wherein for individual ones of at least some of said transactions, the aggregated transaction information indicates one or more characteristics of the individual transaction, wherein the one or more characteristics of the individual transaction comprise one or more of: a user identifier identifying a user completed said individual transaction, a device identifier identifying a mobile communication device associated with said user, payment information associated with said individual transaction, an item identifier identifying an item exchanged in said individual transaction, a timestamp indicating a time at which said individual transaction is completed, an identifier identifying the location of at which the individual transaction is completed, or information indicating the physical location at which the individual transaction is completed.

17. The method of claim 16, wherein said item identifier comprises a stock keeping unit (SKU).

18. The method of claim 11, wherein generating a prediction of a future action to be performed comprises generating a prediction as to an item to be purchased by said particular.

19. The method of claim 11, wherein generating a prediction of a future action to be performed comprises generating a prediction as to a location of to be visited by said particular user.

20. A non-transitory computer-readable storage medium, comprising program instructions computer-executable to:
generate one or more models based on aggregated wireless transaction information indicating sessions that include respective sequences of multiple wireless transactions completed with respective mobile communication devices of a plurality of users, wherein
at least one wireless transaction of at least one of said sequences of wireless transactions is completed using a corresponding mobile device by a user of the mobile device, and wherein
the generation of the one or models comprises:
 a determination of a plurality of paths from the wireless transaction to a plurality of respective other ones of the wireless transactions, wherein a given path from the transaction to another transaction is determined based on a given mobile device completing the other transaction within a given period of time after completing the transaction, and wherein individual paths of said plurality of paths have respective path weights, wherein a given path that has been established a greater number of times than another given path has a higher path weight than the other given path; and
 identification of optimal aggregate paths within the plurality of paths, wherein individual ones of the optimal aggregate paths comprises a series of two or more paths between different wireless transactions, wherein a given aggregate path is identified as an optimal aggregate path out of a plurality of aggregate paths between two wireless transactions by determining that a sum of individual path weights of the given aggregate path is higher than a sum of individual path weights of other ones of the aggregate paths, and wherein the other ones of the aggregate paths are identified as non-optimal aggregate paths,
 and wherein the one or more models comprises a representation of a graph of the plurality of paths, wherein the graph includes multiple levels, each level comprising at least the wireless transaction or one or more of the other wireless transactions, and wherein to determine a given optimal aggregate path to a particular wireless transaction of a given level, one or more aggregate paths previously determined to be non-optimal aggregate paths to one or more respective wireless transactions of a previous level are disregarded;
generate a prediction of a future action to be performed by a user of a particular mobile communication device, wherein
generation of the prediction is dependent upon an evaluation of the one or more generated models and a current session including a path representing a sequence of multiple wireless transactions completed with the particular mobile communication device, and wherein
the generation of the prediction comprises selection of the future action based at least in part on:
 the identification of the optimal aggregate paths between the wireless transaction and different ones of the other wireless transactions, and
 a determination of the transactions that have been completed with the particular mobile communication device;
determine, based on said prediction of the future action, information to transmit to the particular mobile communication device; and
transmit, via a network, said determined information to the particular mobile communication device.

21. The non-transitory computer-readable storage medium of claim 20, wherein the information communicated to the particular mobile communication device comprises an advertisement based on the generated prediction.

22. The non-transitory computer-readable storage medium of claim 20, wherein to generate a prediction of a future action to be performed the program instructions are executable to generate a prediction as to a location to be visited by said user of said particular mobile device.

23. The non-transitory computer-readable storage medium of claim 20, wherein said aggregated wireless transaction information indicates one or more wireless transactions completed via radio-frequency identification (RFID).

24. The non-transitory computer-readable storage medium of claim 20, wherein to generate the one or more models based on aggregated wireless transaction information, the program instructions are executable to create said aggregated wireless transaction information from wireless transaction information reported by one or more transaction terminals.

25. The non-transitory computer-readable storage medium of claim 20, wherein to generate the one or more models based on aggregated wireless transaction information the program instructions are executable to create said aggregated wireless transaction information from wireless transaction information reported by one or more of said respective mobile communication devices of the plurality of users.

26. The non-transitory computer-readable storage medium of claim 20, wherein for individual ones of at least some of said wireless transactions, the generation of the one or more models comprises determination of one or more characteristics of the individual wireless transaction, the one or more characteristics of the individual wireless transaction comprise one or more of: a user identifier identifying a user of the mobile communication device used to complete said individual wireless transaction, a device identifier identifying the mobile communication device used to complete said individual wireless transaction, the payment information associated with said individual wireless transaction, an item identifier identifying an item exchanged in said individual wireless transaction, a timestamp indicating a time at which said individual wireless transaction is completed, an identifier identifying the location of at which the individual wireless transaction is completed, information indicating the physical location at which the individual wireless transaction is completed, or information indicating the direction of travel of the user of the particular mobile communication device.

27. The non-transitory computer-readable storage medium of claim 26, wherein said item identifier comprises a stock keeping unit (SKU).

28. The non-transitory computer-readable storage medium of claim 20, wherein to generate a prediction of a future action to be performed, the program instructions are executable to generate a prediction as to an item to be purchased by said user of said particular mobile device.

29. The non-transitory computer-readable storage medium of claim 20, wherein the generation of the one or models comprises a determination of weights indicating respective levels of user interest associated with respective ones of the paths.

* * * * *